(12) United States Patent
Tomioka et al.

(10) Patent No.: US 7,929,990 B2
(45) Date of Patent: Apr. 19, 2011

(54) RADIO COMMUNICATION TERMINAL

(75) Inventors: Tazuko Tomioka, Kawasaki (JP);
Takeshi Tomizawa, Yokohama (JP);
Tomoya Horiguchi, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 623 days.

(21) Appl. No.: 12/050,878

(22) Filed: Mar. 18, 2008

(65) Prior Publication Data

US 2009/0023469 A1     Jan. 22, 2009

(30) Foreign Application Priority Data

Jul. 19, 2007  (JP) .................................. 2007-188397

(51) Int. Cl.
*H04M 1/00* (2006.01)
(52) U.S. Cl. ........ 455/552.1; 455/447; 455/62; 455/458; 455/502; 375/260; 375/147
(58) Field of Classification Search ............... 455/552.1, 455/447, 62, 458, 502; 375/260, 147
See application file for complete search history.

(56) References Cited

U.S. PATENT DOCUMENTS

| 2003/0036357 | A1* | 2/2003 | McGowan | 455/62 |
| 2004/0235485 | A1* | 11/2004 | Tanaka | 455/447 |
| 2007/0035040 | A1 | 2/2007 | Aoyama | 257/797 |
| 2009/0268830 | A1* | 10/2009 | Birru et al. | 375/260 |

FOREIGN PATENT DOCUMENTS

| JP | 5-14424 | 1/1993 |
| JP | 7-327059 | 12/1995 |
| JP | 2001-267997 | 9/2001 |

OTHER PUBLICATIONS

U.S. Appl. No. 11/888,513, filed Aug. 1, 2007, Horiguchi et al.
U.S. Appl. No. 11/827,549, filed Jul. 12, 2007, Horiguchi et al.

* cited by examiner

*Primary Examiner* — Sanh D Phu
(74) *Attorney, Agent, or Firm* — Ohlandt, Greeley, Ruggiero & Perle, L.L.P.

(57) ABSTRACT

A radio communication terminal includes a detection unit configured to detect a plurality of usable frequencies of a frequency range, in which the radio communication terminal plans to transmit, at least depending on whether or not a power of a first received signal is greater than a first threshold, a selection unit configured to select, when a first frequency band from $f0+f1$ to $f0+f1+\Delta f1$ ($f1$ is a first frequency, and $\Delta f1$ is a first bandwidth) and a second frequency band from $f0-f1-\Delta f1$ to $f0-f1$ are simultaneously usable with respect to a center frequency $f0$ of a utilizing frequency range including the usable frequencies, the first frequency band and the second frequency band as a pair of utilizing frequency bands, and a transmission unit configured to transmit different signals in the pair of utilizing frequency bands.

21 Claims, 14 Drawing Sheets

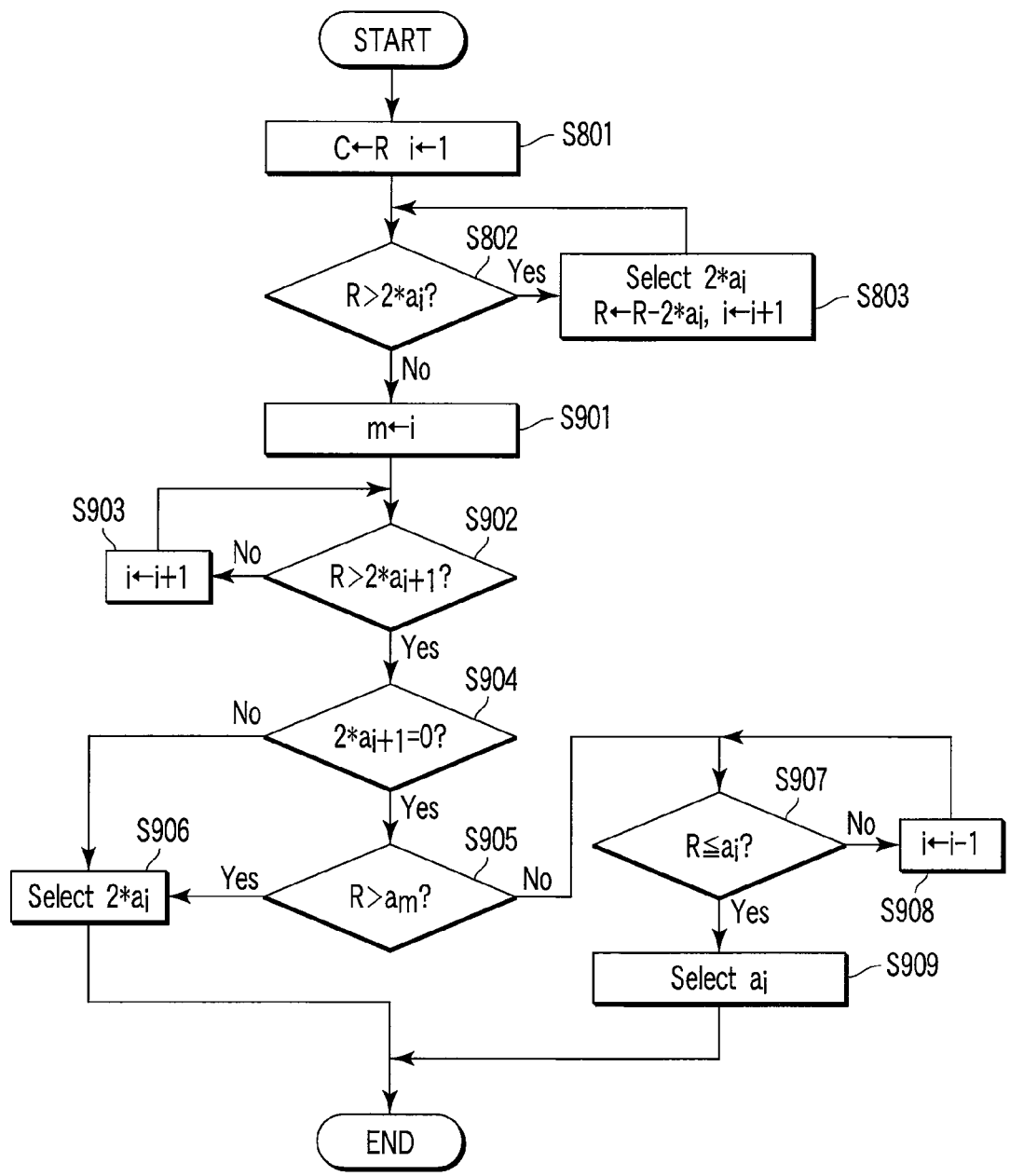
F I G. 9

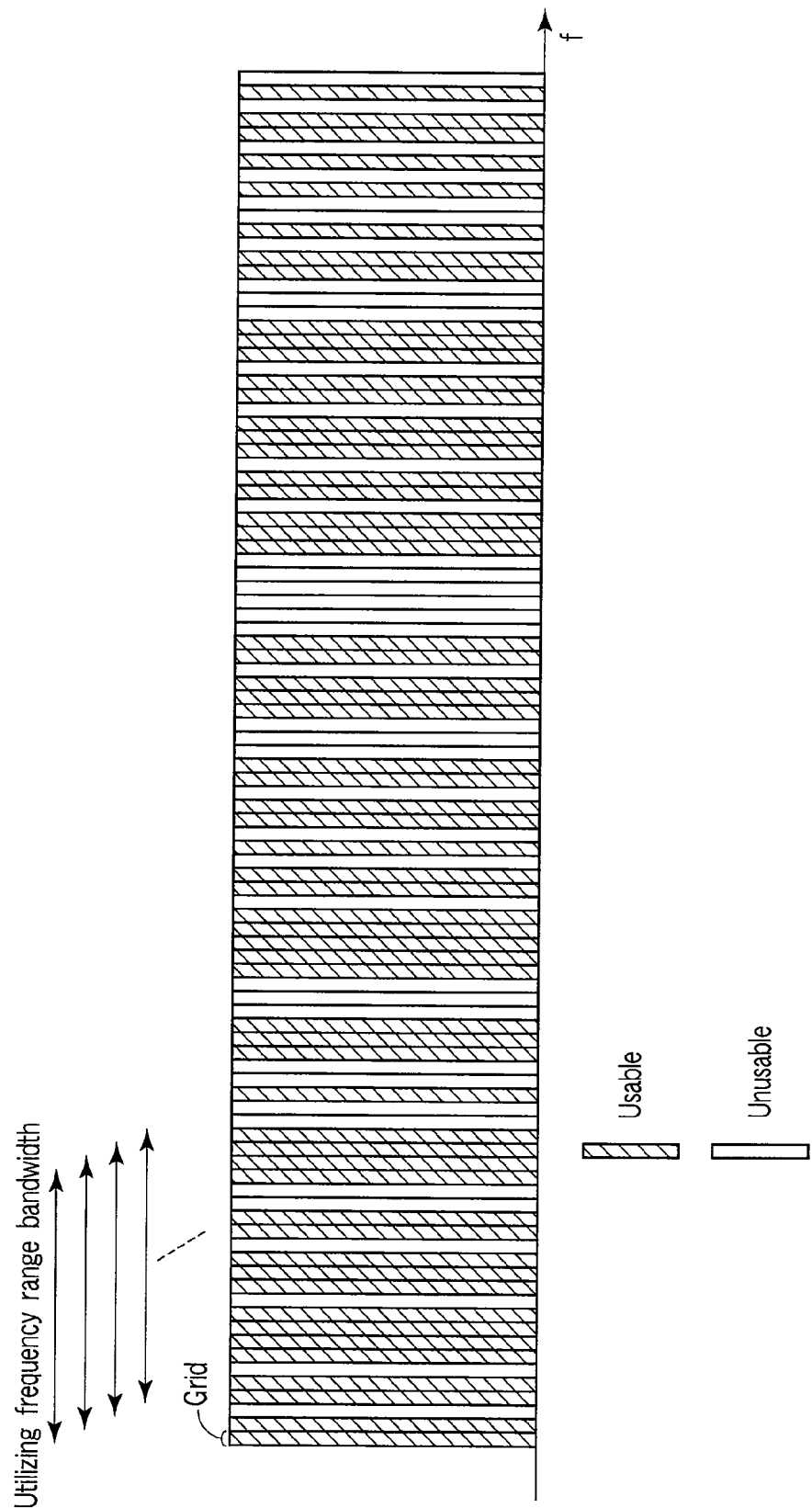
F I G. 15

RADIO COMMUNICATION TERMINAL

CROSS-REFERENCE TO RELATED APPLICATIONS

This application is based upon and claims the benefit of priority from prior Japanese Patent Application No. 2007-188397, filed Jul. 19, 2007, the entire contents of which are incorporated herein by reference.

BACKGROUND OF THE INVENTION

1. Field of the Invention

The invention relates to a radio communication terminal which uses a plurality of discrete frequencies at the same time.

2. Description of the Related Art

In order to increase the communication speed of consumer radio communication devices, movements to change the assignment and usage of frequencies have begun. Previously, specific bands are exclusively assigned for specific applications. However, recently, some bands have been opened up to a plurality of applications without licenses. Furthermore, a very wide band has been opened to ultra-wideband (UWB) system, which is limited to low-power, short-range communications so as to be used together with other applications.

As a future system, studies about an idle frequency detection type cognitive radio system which operates to output a radio wave of a given frequency if it is confirmed that the frequency is not used, and to stop the communication when a system having priority to that frequency begins to transmit a radio wave have begun.

Since the cognitive radio system uses frequencies while avoiding those which are being used by a system having priority (to be referred to as a primary system hereinafter), usable frequencies are in a so-called vermiculate state. The bandwidth that can be used contiguously varies depending on frequencies.

In order to assure a bit rate required for high-speed communications, since a large bandwidth in total need be assured, the system cannot help but use discrete frequency bands in the vermiculate state. Usable frequencies change frequently upon start and stop of use of primary systems, and the system need to transmit and receive signals of different bandwidths at discrete frequency bands at the same time. In such case, a transmitter and receiver are more likely to digitally multiplex and separate a plurality of signals within a wide band using a set of an analog unit, analog-to-digital converter, and digital-to-analog converter, and to perform modulation and demodulation in a digital unit. Upon simultaneously making analog-to-digital and digital-to-analog conversions of signals within a large bandwidth, the analog-to-digital and digital-to-analog converters require large bandwidths. Currently, the clock speeds of these devices are exponentially increasing. However, it is still difficult to manufacture devices using clocks on the GHz order at low cost and with high precision and high performance.

In addition to the problem of the speed, due to difficulty in filter configuration, the transmitter and receiver may perform analog-to-digital and digital-to-analog conversions of in-phase (I) signal components and orthogonal phase (Q) signal components at a half clock speed and may add and separate I and Q components in an analog unit (for example, see JP-A 5-14424 [KOKAI] FIG. 6, [0003], [0004]).

As a system which simultaneously uses a plurality of frequencies, for example, a general frequency division multiplex system is available. Also, a special frequency division multiplex system which inverts an identical signal in the frequency domain and allocates them to different frequencies is available (for example, see JP-A 2001-267997 [KOKAI]). As a system in which one terminal simultaneously uses two or three frequencies, for example, a system using subcarrier AM modulation is available.

In the transmitter with such configuration, I and Q components generated by the digital unit, the phases of I and Q signal need be precisely orthogonal to each other and be added to have equal gains upon adding in the analog unit. Or else, intended signals cannot be generated upon adding, thus posing a problem of imbalance. In a conventional radio communication, a problem posed due to imbalance is that within the self band. That is, the signal to interference power ratio of the self signal deteriorates, thus impairing communication performance (for example, see JP-A 7-327059 [KOKAI]). As described in JP-A 7-327059 (KOKAI), efforts for achieving better reception performance by correcting such deterioration in a receiver are being made. Furthermore, various measures for the transmitter to reduce the imbalance as much as possible have been proposed.

The cognitive radio system uses frequencies to fill the niche of frequencies used by the primary system. When the digital-to-analog converter converts signals in a plurality of frequency bands into analog signals independently for I and Q, and the analog unit adds these signals while the imbalance between I and Q still remains, spurious components may be generated at the frequencies of the primary system. The spurious components may interfere with the primary system depending on their magnitudes. It is difficult for a cognitive terminal, which is configured to simultaneously digital-to-analog convert a very large bandwidth, to reduce the imbalance with respect to the very wide band.

BRIEF SUMMARY OF THE INVENTION

In accordance with a first aspect of the invention, there is provided a radio communication terminal comprising: a detection unit configured to detect a plurality of usable frequencies of a frequency range, in which the radio communication terminal plans to transmit, at least depending on whether or not a power of a first received signal is greater than a first threshold; a selection unit configured to select, when a first frequency band from $f0+f1$ to $f0+f0+\Delta f1$ ($f1$ is a first frequency, and $\Delta f1$ is a first bandwidth) and a second frequency band from $f0-f1-\Delta f1$ to $f0-f1$ are simultaneously usable with respect to a center frequency $f0$ of a utilizing frequency range including the usable frequencies, the first frequency band and the second frequency band as a pair of utilizing frequency bands; and a transmission unit configured to transmit different signals in the pair of utilizing frequency bands.

BRIEF DESCRIPTION OF THE SEVERAL VIEWS OF THE DRAWING

FIG. 9 is a flowchart showing an example in which the radio communication terminal of the embodiment selects a utilizing frequency band;

FIG. 15 shows an example of a center frequency determination method of a utilizing frequency range.

DETAILED DESCRIPTION OF THE INVENTION

Figure 1:
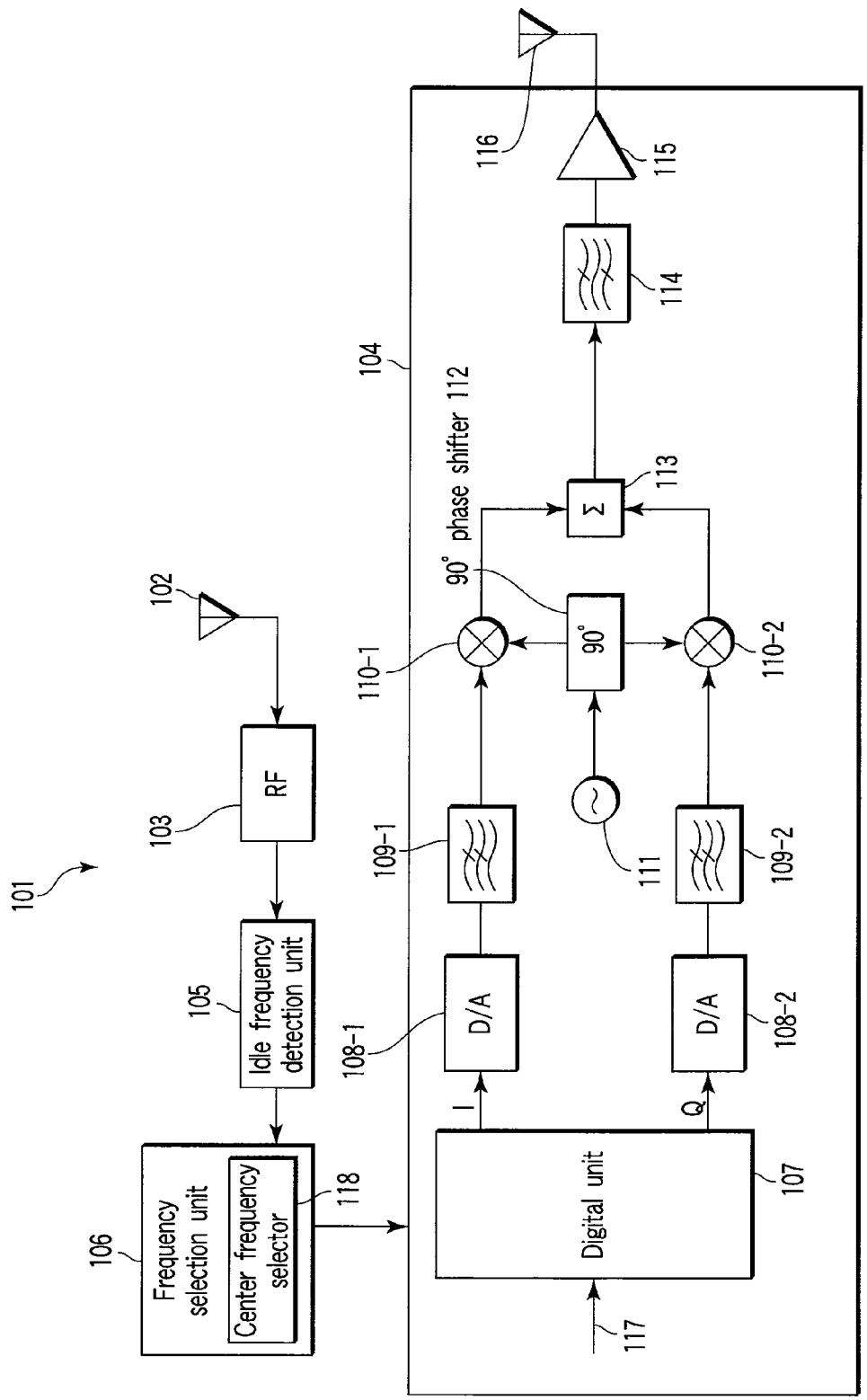
FIG. 1 is a block diagram of a radio communication terminal according to one embodiment.

A radio communication terminal according to an embodiment of the invention will be described in detail hereinafter with reference to the accompanying drawings. Note that components denoted by the same reference numbers perform the same operations in the embodiment to be described hereinafter, and a repetitive description thereof will be avoided.

The radio communication terminal of the invention can prevent the occurrence of interference with frequencies other than the utilizing bands due to the imbalance between I and Q resulting from the analog unit.

The accompanying drawings illustrate only parts directly related to the embodiment, and do not illustrate any parts which are not directly related. For example, the radio communication terminal of this embodiment is a two-way terminal in most cases, and comprises a data receiving and demodulation function. However, since such function is not directly related to the arrangement of this embodiment, it is not illustrated.

Note that the definitions of terms in this specification are as follows. A "utilizing frequency range" is a band which simultaneously includes a plurality of signals to be transmitted by that terminal. A "usable (or unusable) frequency" is a frequency which is determined by an idle frequency detection unit 105 (to be described later) to be usable (or unusable). A "utilizing frequency band" is a group of frequencies which are determined to be usable, and includes frequencies selected by the terminal to be actually used. A description of a "frequency band", "range of frequencies", "group of frequencies", "frequencies in clusters", or the like indicates a frequency band as a cluster having a certain bandwidth independently of whether they may or may not be used. A "frequency" indicates a single frequency as commonly understood, and it also indicates a frequency band with a very small bandwidth, i.e., a frequency band whose bandwidth need not be considered in many cases in terms of the processing on the terminal.

A radio communication terminal of this embodiment will be described below with reference to FIG. 1.

A radio communication terminal 101 of this embodiment includes a receiving antenna 102, receiving RF unit 103, idle frequency detection unit 105, frequency selection unit 106, transmission unit 104, and transmission antenna 116.

The receiving RF unit 103 amplifies, as needed, a frequency band from which idle frequencies need be detected of a radio wave received by the receiving antenna 102, and makes frequency conversion and the like. Furthermore, the unit 103 converts the processing result to a form suited to the processing of the idle frequency detection unit 105, and passes the converted result to the idle frequency detection unit 105.

The idle frequency detection unit 105 makes carrier sense for respective frequencies within the range of frequencies which are hoped to be used in transmission by the radio communication terminal 101 or within the range of frequencies to be used in next transmission. The unit 105 classifies the frequencies into usable and unusable frequencies based on the carrier sense results. Note that the received radio wave may be converted into a digital signal in an arbitrary step before the idle frequency detection processing is completed, and may be digitally processed. Of course, such conversion is not required if a part for processing the radio wave in the idle frequency detection unit 105 is configured by analog circuits.

More specifically, the idle frequency detection unit 105 searches to see whether a radio wave of a primary system is detected from each frequency in a unit of the bandwidth of the primary system. Simply put, the unit 105 examines whether a radio wave which occupies a corresponding bandwidth is detected to have a predetermined power or higher. If such a radio wave is detected, the unit 105 determines that the band occupied by the primary system is unusable; otherwise, it determines that the band is usable. When the idle frequency detection unit 105 has a high idle frequency detection function, it has a function of identifying whether the received radio wave is that of the primary system or electromagnetic noise, based on the bandwidth, a temporal variation of the usage state, temporal and frequency features of signals, in consideration of receiving electromagnetic noise in place of the radio wave of the primary system. If the idle frequency detection unit 105 determines that the received radio wave is electromagnetic noise, and its power does not impair the receiving performance of the terminal, it classifies a frequency from which only electromagnetic noise is detected as a usable frequency. If the power of the electromagnetic noise impairs the receiving performance, the unit 105 classifies that frequency as an unusable frequency. However, in this case, the unit 105 sets a flag that allows only spurious components, as will be described in modification 2 later.

The radio communication terminal 101 has a database (not shown) associated with usable and unusable frequencies, and stores the range of frequencies which may be used in transmission by itself. This range need not always be that of continuous frequencies. A frequency of a system, which cannot be easily determined as a usable or unusable frequency by carrier sense of the terminal (for example, a primary system which only receives a radio wave or the like) may be excluded from a given range of frequencies, and that range may become discontinuous. However, in the following description, it is assumed that the range of frequencies which are likely to be used is basically continuous and, as for such exclusion, those frequencies are always determined as unusable frequencies.

Of course, when the range of frequencies which are likely to be used mainly includes two frequency bands which are considerably separate from each other, these frequency bands are preferably processed independently. However, when the bandwidth of excluded frequencies, which is sandwiched between the above frequency bands, is sufficiently less than the utilizing frequency range, the processing of the terminal can be facilitated by handling such range as a continuous one.

The frequency selection unit 106 receives the detection result from the idle frequency detection unit 105. The frequency selection unit 106 selects, as utilizing frequency bands, a plurality of frequency bands, which match the features of this embodiment, from the detection result, as will be described later with reference to FIGS. 2B(b), 4, 5, 7, and 11, and notifies the transmission unit 104 of the utilizing frequency bands. When the transmission unit 104 is notified of the utilizing frequency bands, it starts transmission based on the utilizing frequency bands. The frequency selection unit 106 includes a center frequency selector 118.

The transmission unit 104 includes a digital unit 107, digital-to-analog converters 108-1 and 108-2, low-pass filters (LPFs) 109-1 and 109-2, frequency converters 110-1 and 110-2, local oscillator 111, 90° phase shifter 112, adder 113, band-pass filter (BPF) 114, and power amplifier (PA) 115. The transmission unit 104 acquires information of the utilizing frequency bands selected by the frequency selection unit 106. The acquired information may influence the subsequent operations of the respective devices in the transmission unit 104 except for the digital-to-analog converters 108-1 and 108-2.

The digital unit 107 receives transmission data which has undergone upper layer processing from a data input 117. The digital unit 107 converts input data into a complex modulation signal in forms suited to each utilizing frequency band based on the information of the utilizing frequency bands of which the frequency selection unit 106 notifies the transmission unit 104. Subsequently, the digital unit 107 allocates the respective complex modulation signals in corresponding utilizing frequency bands to form transmission signals in those bands. The formed transmission signals are baseband signals, i.e., those of complex numbers in which the center frequency of the utilizing frequency range is located at zero and signals are allocated even to negative frequencies.

The digital unit 107 separates the generated complex baseband signals into I and Q components, and outputs them to the different digital-to-analog converters 108-1 and 108-2. The digital-to-analog converters 108-1 and 108-2 convert them into analog signals, and output the analog signals. The analog signals output from the digital-to-analog converters respectively pass through the LPFs 109-1 and 109-2 to remove alias components.

The local oscillator 111 outputs a local signal corresponding to the center frequency of the utilizing frequency range. The 90° phase shifter 112 receives the local signal, and outputs two signals that are 90° out of phase to the frequency converters 110-1 and 110-2. The frequency converter 110-1 receives the baseband signals of I components, and the frequency converter 110-2 receives those of Q components. The frequency converters 110-1 and 110-2 convert these baseband signals into RF signals by the 90°-shifted local signals. Note that the frequency converters 110-1 and 110-2 are illustrated as mixers in FIG. 1. However, in practice, these frequency converters also have various blocks such as gain adjustment blocks and the like, and their frequency conversion function is formed by these blocks as a whole.

The adder 113 adds the signals of the I and Q components converted into RF frequencies. In order to prevent generation of spurious components due to an imbalance, generally, the phase relationship and amplitude relationship between the I and Q components need be accurately maintained after the I and Q components are separated by the digital unit 107 until they are added by the adder 113.

The BPF 114 removes spurious components outside the utilizing frequency range from the sum signal. The PA 115 amplifies the signal in which spurious components are removed. The signal is transmitted from a transmission antenna 116.

Problems in such transmission system will be briefly described below with reference to FIGS. 2A(a), 2A(b), and 2B(a), and it will be described that the problems can be solved by the arrangement, operations, and effects of this embodiment.

As described above using FIG. 1, the phase relationship and amplitude relationship between the I and Q components need be accurately maintained after they are separated until they are mixed. However, since the components after the digital-to-analog converters are analog circuits, it is difficult to perfectly maintain equal gains and 90° phase difference at all frequencies in the band. Hence, an imbalance is inevitably generated more or less. Upon generation of an imbalance, signals whose frequencies are inverted with respect to the center frequency are superposed on signals as spurious components.

Figure 2A:
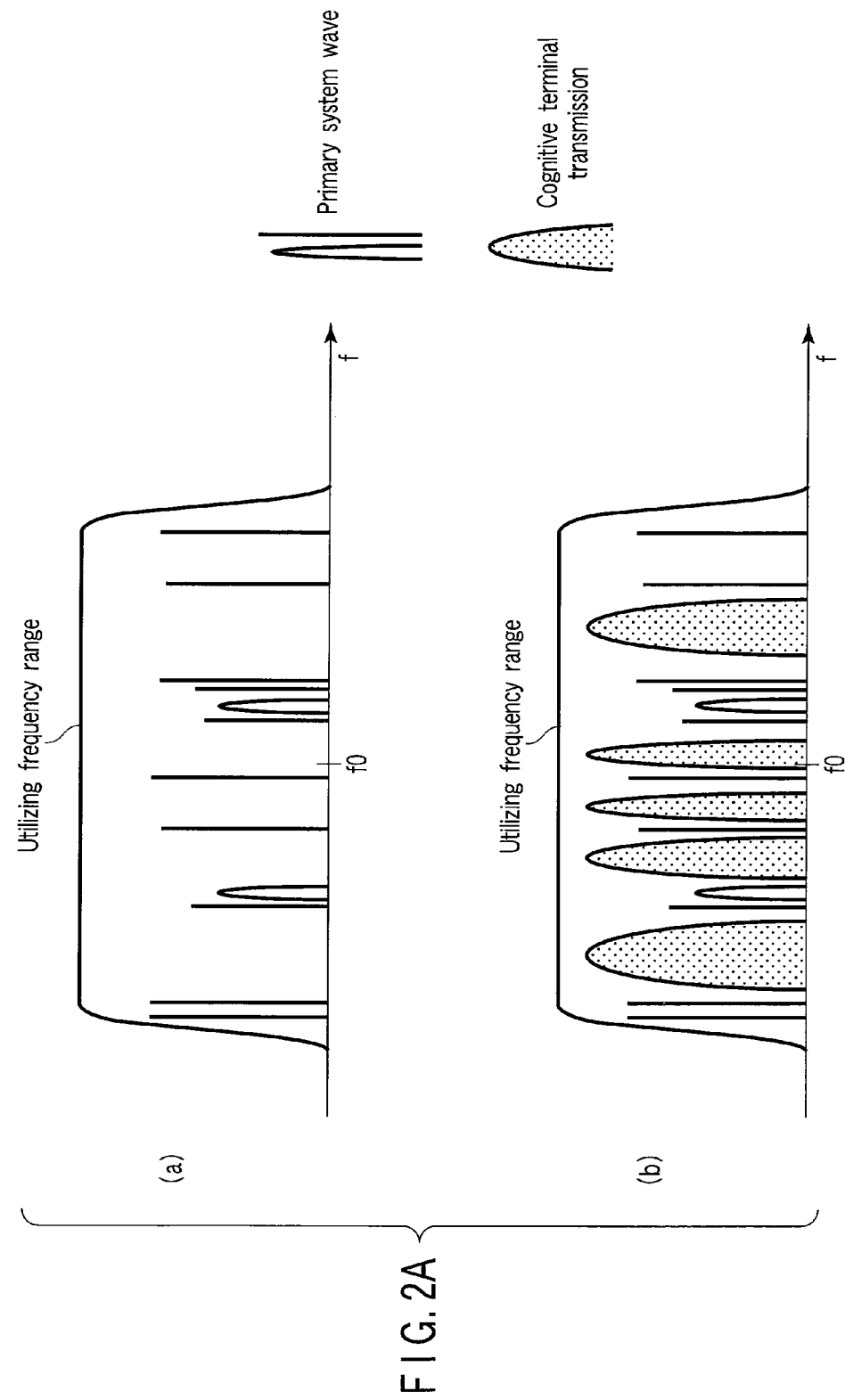
FIG. 2A shows the utilizing frequency bands of primary system waves and cognitive terminal transmissions.
Figure 2B:
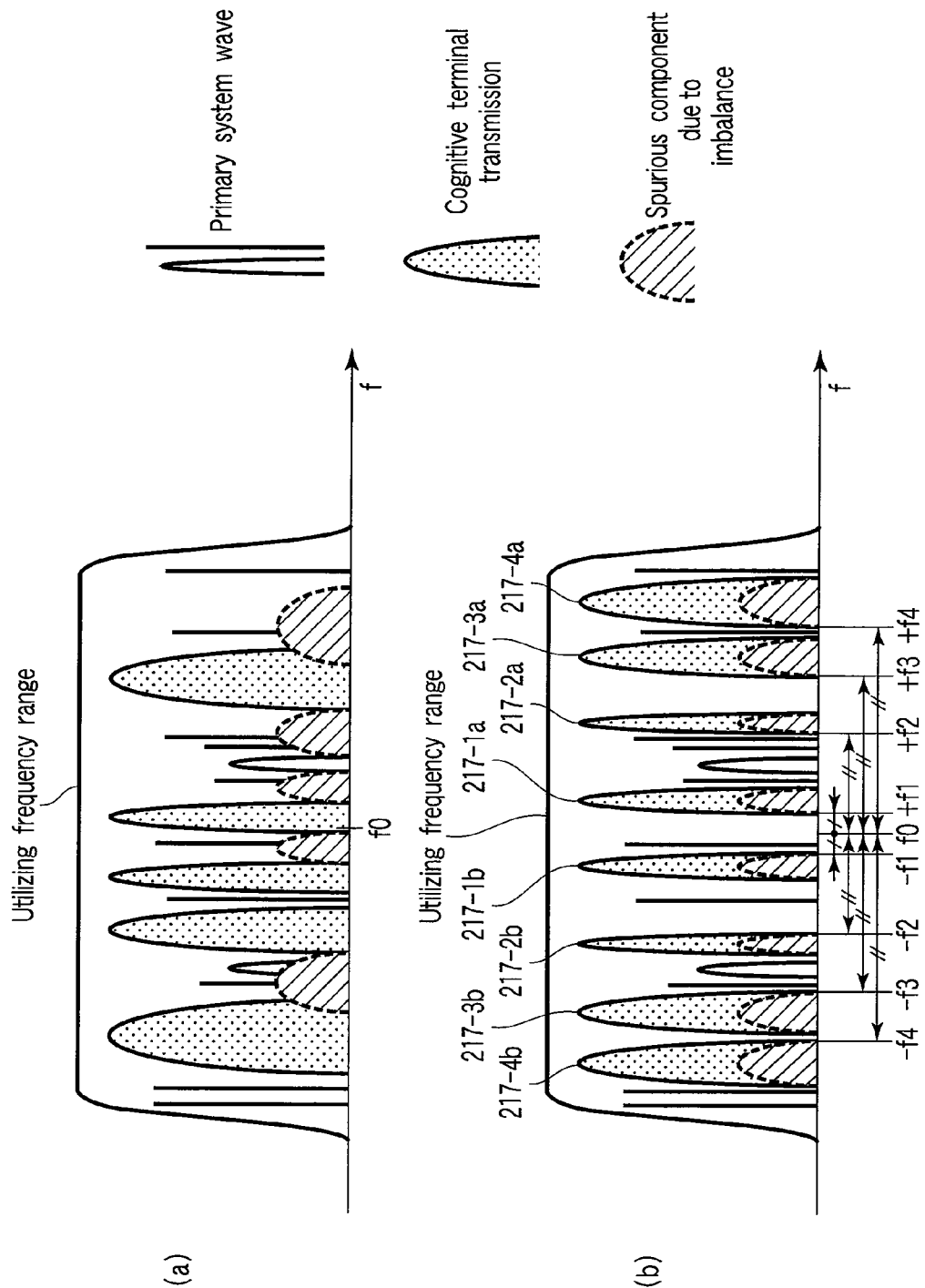
FIG. 2B shows the utilizing frequency bands of spurious components, primary system waves, and cognitive terminal transmissions.

For example, assume that a primary system uses a band, as shown in FIG. 2A(a), and a cognitive terminal specifies that utilizing frequency range, as shown in FIG. 2A(b). Note that primary system signals outside the utilizing frequency range are not illustrated. The radio communication terminal of this embodiment uses gaps of the primary system. Assume that the radio communication terminal discretely allocates its own transmission signals in these gaps, as shown in FIG. 2A(b). In this state, if the analog circuits suffer an imbalance between I and Q components, spurious components formed by inverting the frequencies of cognitive terminal signals with respect to center frequency f0 are generated to have magnitudes corresponding to that of the imbalance, as shown in FIG. 2B(a). In FIG. 2B(a), the spurious components apparently overlap the frequencies which are being used by the primary system. If a receiver of the primary system is located near a cognitive transmitter, an interference may occur.

Hence, this embodiment selects utilizing frequency bands to be symmetric about the center frequency. FIG. 2B(b) shows this example. The usage state of the primary system is the same as those in FIGS. 2A(a), 2A(b), and 2B(a), but the utilizing frequency bands of the cognitive terminal are different.

The cognitive terminal of this embodiment selects a pair of frequency bands 217-1*a* and 217-1*b* as utilizing frequency bands as shown in FIG. 2B(b). The frequency bands 217-1*a* and 217-1*b* are located at positions symmetric about the center frequency f0 and have the same bandwidth. That is, the frequency band 217-1*a* occupies frequencies f0+f1 to f0+f1+Δf1, and the frequency band 217-1*b* occupies frequencies f0−f1−Δf1 to f0−f1. Likewise, frequency bands 217-2*a* and 217-2*b* occupy bands of frequencies f0±f2 to f0±f2±Δf2 symmetric about the center frequency f0. The same applies to frequency bands 217-3*a* and 217-3*b*, and 217-4*a* and 217-4*b*. These utilizing frequency bands are also selected while avoiding the frequencies which are being used by the primary user.

Figure 8:
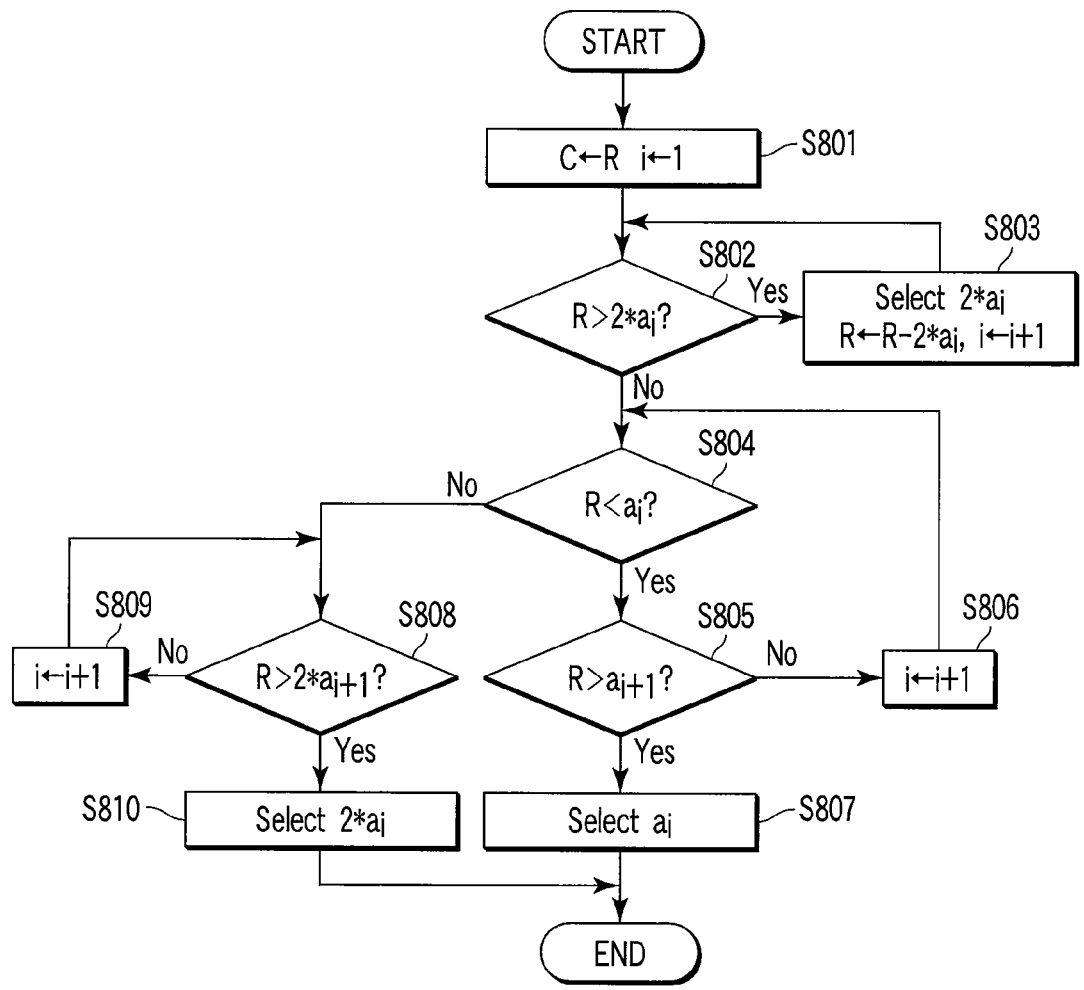
FIG. 8 is a flowchart showing an example in which the radio communication terminal of the embodiment selects a utilizing frequency band.

Details of an algorithm for selecting such pairs of utilizing frequency bands while avoiding the frequencies which are being used by the primary user will be described later with reference to FIGS. 8, 9, and 13. Note that in this embodiment, the bandwidth of each utilizing frequency band is different for respective utilizing frequency band pairs depending on the usage state of the primary system in that situation. The respective utilizing frequency bands may be used by single carriers or by multiple carriers like OFDM.

When the utilizing frequency bands are selected to be symmetric about the center frequency, spurious components due to an imbalance are generated on the utilizing frequency bands of the cognitive terminal, as shown in FIG. 2B(b). Although the transmission quality of the cognitive terminal deteriorates, interference to the primary user can be prevented. With this arrangement, the radio communication terminal that hardly interferes with the primary user can be implemented.

In the example of FIG. 2B(b), the eight utilizing frequency bands are simultaneously selected as four pairs. The number of pairs is not particularly limited, and only one pair may be selected. Moreover, for example, when the selected utilizing frequency range does not include any unusable frequency, and the cognitive terminal can use the whole utilizing frequency range, that band need not be intentionally divided into two bands to be used as a pair of utilizing frequency bands, but it may be used as one utilizing frequency band. When a primary user begins to transmit in the utilizing frequency range which is being used by the cognitive terminal, the arrangement of this embodiment may be applied to set pairs of utilizing frequency bands by dividing the utilizing frequency range.

Figure 3:
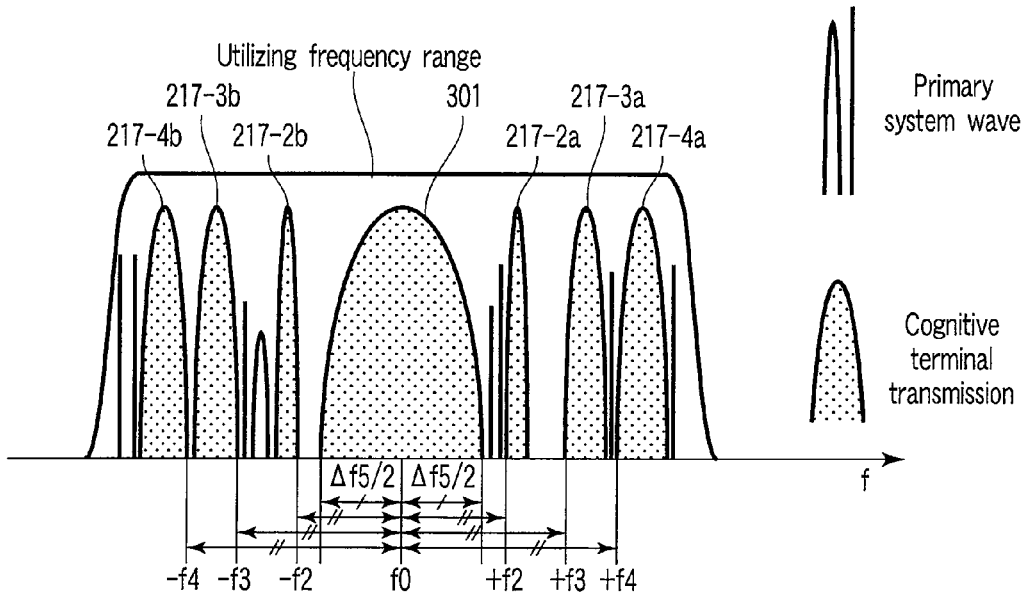
FIG. 3 shows an example of a method of assuring a utilizing frequency band of the embodiment.

When the usage state of the primary system within the utilizing frequency range is as shown in FIG. 2A(a), the cognitive terminal uses only a pair of utilizing frequency bands symmetrically selected to have f0 as the center. However, in some cases, the primary system does not exist near the center of the utilizing frequency range, and usable frequencies extend across a relatively wide band, as shown in FIG. 3. In such case, a sole utilizing frequency band 301 which does not form any pair and has a large bandwidth Δf5 is set near the center frequency f0, as shown in FIG. 3, and the frequency bands 217-2a and 217-2b, 217-3a and 217-3b, and 217-4a and 217-4b are preferably selected to be symmetric about f0, as in FIG. 2B(b). In this way, even when the frequency band which is usable in clusters is available, and no usable frequency band which is large enough to form a pair with that frequency band exists around it, usable frequencies which can be assured in clusters can be efficiently used.

As one problem in such a multi-carrier system, a large peak to average power ratio (PAPR) of signals due to multiplexing of signals of a plurality of carriers is known. To circumvent this problem, the transmitter and receiver are required to have a wider dynamic range, resulting in an increase in consumption power and circuit scale. When respective carriers are modulated in a single carrier format (not in the OFDM or CDMA format), if the respective carriers have approximately equal powers, the required dynamic range becomes narrower with decreasing number of carriers to be multiplexed. Alternatively, when the power that the cognitive terminal can transmit is given by a spectral mask defined by the spectral density per unit frequency, and when the spectral heights of signals to be transmitted in respective utilizing frequency bands become nearly equal to each other, as shown in FIG. 3, the power ratio of a signal of one utilizing frequency band increases if it has a large bandwidth. Even when the number of multiple carriers is large, when one of these carriers has a very much greater power than others (i.e., has a very large bandwidth), the PAPR is roughly determined by the carrier having the large power, and the contributions of other carriers become small. As a result, the PAPR does not become very large.

Therefore, when a wide usable frequency band can be assured, it is set and used at the center without being divided, thus reducing the PAPR.

Figure 10:
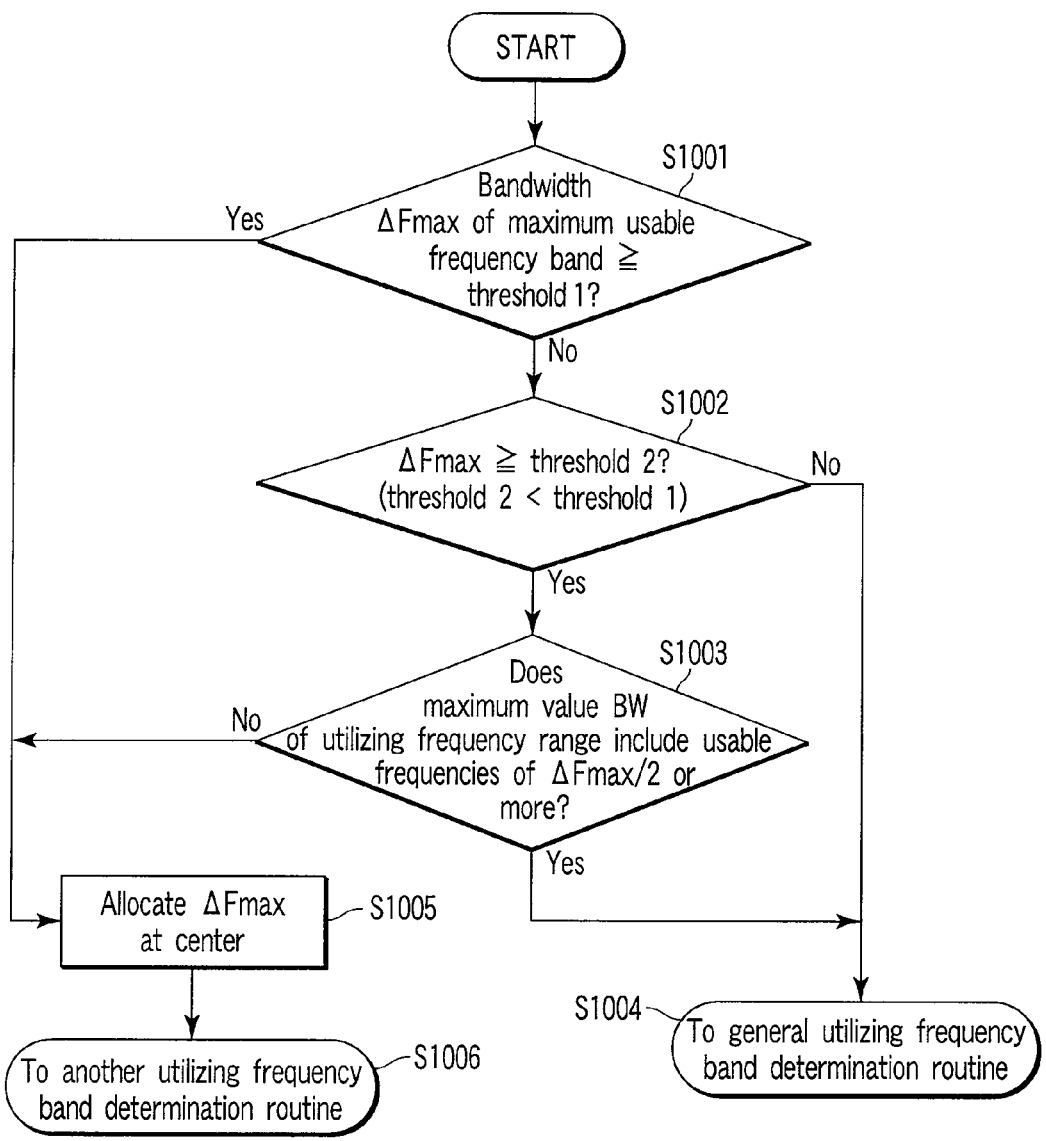
FIG. 10 is a flowchart showing an example in which a usage within a utilizing frequency range of the radio communication terminal of the embodiment is determined.

An algorithm for selecting whether a large utilizing frequency band is set at the center or is used as one of a pair of utilizing frequency bands will be described later with reference to FIG. 10. Note that unusable frequencies include not only a band which is determined by the idle frequency detection unit 105 that a primary user is using that band, but also, for example, a band where a primary user who does not transmit any radio wave or uses that band at a very small spatial or frequency power density is more likely to exist. Furthermore, unusable frequencies may change temporally. Moreover, the cognitive terminal often stops transmission on purpose to detect the primary use. During this period, the unusable frequencies include such stopped frequencies. Also, the cognitive terminal may deliberately, periodically set frequencies to be unusable even when no radio wave is detected, so as to help carrier sense of the primary user who starts transmission after the carrier sense.

(Modification 1)

Figure 4:
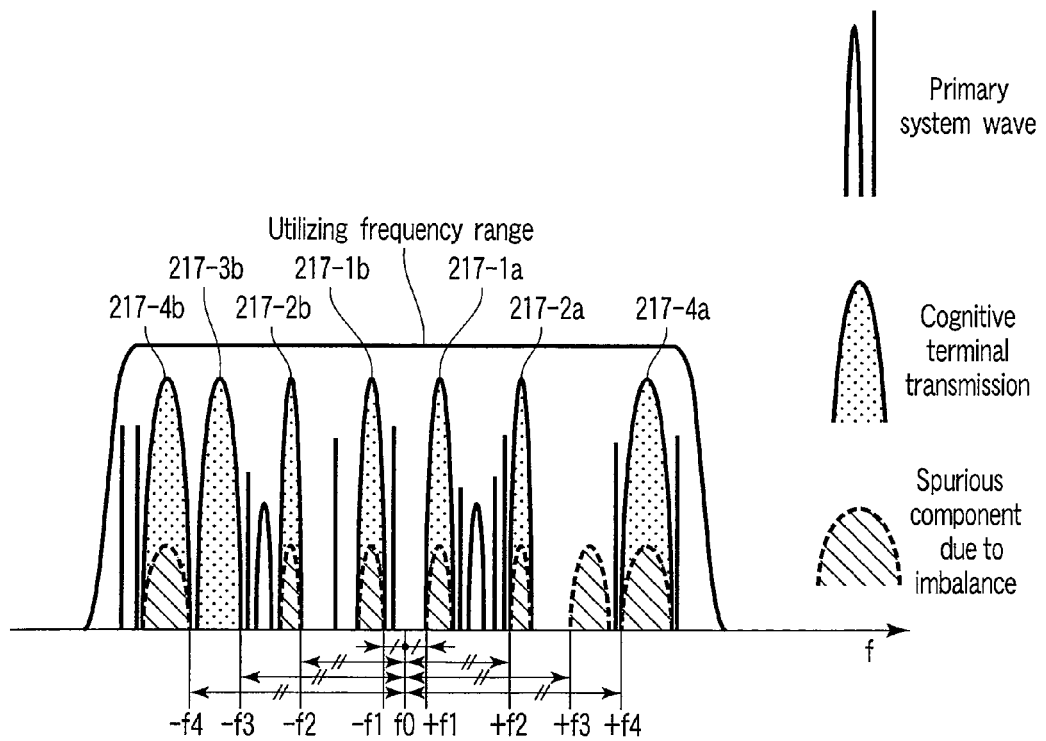
FIG. 4 shows an example of a method of assuring a utilizing frequency band of the embodiment.

In another example of this embodiment, after selection of a pair of utilizing frequency bands, one of the pair may be managed in a no-signal state. That is, no signal is transmitted using one frequency band in the pair. FIG. 4 shows such example. The usage state of the primary system is the same as that in FIG. 2A(a), and utilizing frequency bands are selected in nearly the same manner as in FIG. 2B(b). However, no signal is transmitted at a frequency f0+f3 which is to form a pair with the frequency band 217-3b. Since frequencies f0+f3 to f0+f3+Δf3 are usable frequencies, the frequency selection unit 106 selects them as a utilizing frequency band together with the frequency band 217-3b, but no signal is sent at the frequencies f0+f3 to f0+f3+Δf3. The reason why the frequencies f0+f3 to f0+f3+Δf3 are not used is that, for example, the transmission rate required by the cognitive terminal can be satisfied even when this band is not used. As a result, the number of carriers is decreased, thus reducing the processing load on the terminal and the dynamic range.

In this case, since a signal in the frequency band 217-3b generates spurious components due to an imbalance, only spurious components exist at the frequencies f0+f3 to f0+f3+Δf3. If the reason why the frequencies f0+f3 to f0+f3+Δf3 are not used is to find the primary user there even during transmission of the cognitive terminal, the frequency allocation shown in FIG. 4 is not desirable. In this case, the f0+f3 to f0+f3+Δf3 are desirably classified as unusable frequencies. As a result, since the frequency selection unit 106 does not select the frequency band 217-3b as a utilizing frequency band, no spurious components leak into the frequencies f0+f3 to f0+f3+Δf3, thus detecting the primary user with a higher sensitivity.

When the cognitive terminal does not want to generate any spurious components at the frequencies f0+f3 to f0+f3+Δf3, after selection of a pair of utilizing frequency bands, it may manage both the frequency bands in a no-signal state. That is, no signal is sent using these utilizing frequency bands. Not only a signal is output at the frequency f0+f3 to be paired with the frequency band 217-3b but also no signal is output using the frequency band 217-3b. In this manner, spurious components cease to be generated at the frequencies f0+f3 to f0+f3+Δf3. This method is used, for example, when the cognitive terminal temporarily stops transmission of signals using both the frequency bands to help carrier sense of itself or another radio communication terminal.

As shown in FIG. 1, the frequency selection unit 106 basically includes the center frequency selector 118. In this embodiment, the center frequency f0 of the utilizing frequency range is continuously variable within a given range, i.e., the range of frequencies that are likely to be used by the terminal of this embodiment. Or, the center frequency f0 can be selected from several frequencies. That is, there is a room for selection or change of the utilizing frequency range as needed.

The upper limit of the bandwidth of the utilizing frequency range of the terminal of this embodiment is defined (e.g., as 1 GHz) by limitations on the bandwidths of the analog-to-digital and digital-to-analog converters. On the other hand, if frequencies that are likely to be used fall within the range of 3 to 12 GHz, the center frequency f0 can be selected within the range of 3.5 to 11.5 GHz. By setting variable cutoff frequencies of the LPFs 109-1 and 109-2, a value narrower than the upper limit value may often be permitted as the bandwidth of the utilizing frequency range. In this case, the center frequency can be selected within the range from a frequency slightly higher than 3 GHz to one slightly lower than 12 GHz.

There are various usage states of radio waves depending on frequency bands. The properties of a radio wave, e.g., the rectilinear property, attenuation amount per unit distance, and the like vary depending on frequencies. The terminal of this embodiment has specific performance requirements as a communication terminal, i.e., a given transmission rate and transmission distance, and the frequency selection unit 106 selects the utilizing frequency range to meet these requirements at the same time.

In the arrangement of this embodiment, utilizing frequency bands are selected to be symmetric about the center frequency f0 of the utilizing frequency range. In most cases, the transmission rate is proportional to the total of the bandwidths of utilizing frequency bands in the utilizing frequency range. Since selection is made while avoiding unusable frequencies, it is often difficult to meet a high transmission rate requirement if f0 is absolutely fixed, since the terminal of this embodiment cannot control unusable frequencies. Depending on the distribution of unusable frequencies, very fine utilizing frequency bands must often be set, and a fixed center frequency is not desirable in term of the aforementioned problem of the PAPR. Also, in some cases, transmission is to be made while being limited to lower frequencies, so as to attain longer-distance transmission.

In such case, by allowing f0 to vary, it is possible to facilitate selection of utilizing frequency bands which are assured to be symmetric about the center frequency. This embodiment provides a step of searching a limited frequency range for a utilizing frequency range which meets the transmission rate requirement or has a small number of utilizing frequency bands while meeting the transmission rate requirement. As a result, utilizing frequency bands which nearly satisfy the requirements of the terminal are more likely to be selected.

In this case, the transmission unit 104 is configured to generate transmission signals in correspondence with variable f0, and can change the frequency of the local oscillator 111 in accordance with an instruction from the frequency selection unit 106.

(Modification 2)

Another example of this embodiment will be described below with reference to FIG. 5. A frequency is classified as an unusable frequency but it is set with a flag that allows only spurious components in, for example, the following cases. The first case is when the idle frequency detection unit 105 observes a radio wave at that frequency, and determines that the radio wave is not that of the primary user but is electromagnetic noise from a PC or the like. The second case is when the idle frequency detection unit 105 determines that the radio wave comes from another terminal having priority equivalent to or lower than the terminal of this embodiment, and does not impose any serious influence on each other's receiving sensitivity in terms of the distance. The third case is when the radio comes from the primary user, but the primary user inherently has a strong resilience to spurious components generated by the terminal of this embodiment or a power sufficiently greater, and suffers less influence of interference due to spurious components. In these cases, the terminal of this embodiment identifies that the frequency is allowed to include spurious components. That frequency is not selected as a utilizing frequency band, but utilizing frequency bands are selected to permit to generate spurious components at that frequency. For example, the terminal has a database associated with the assigned frequencies of respective primary systems, and makes such determination with reference to the database. Alternatively, the terminal may make determination using a spectral mask to be described later.

Assuming right and left frequency bands symmetric about the center frequency f0, a case will be examined below wherein all frequencies in one of the right and left frequency bands are usable, some of the other frequency band are usable, and the remaining frequencies are those which allow only spurious components. In such case, a frequency band in the side which all frequencies are usable, and usable frequencies in the other side of the utilizing frequency range are selected as a utilizing frequency band.

Figure 5:
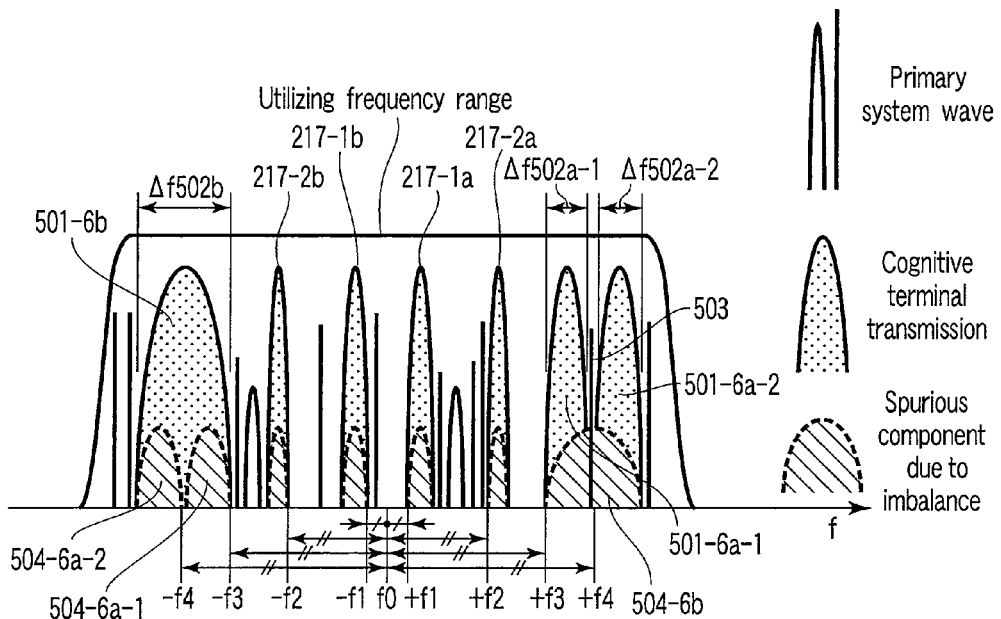
FIG. 5 shows an example of a method of assuring a utilizing frequency band of the embodiment.

The state shown in FIG. 5 is partially different from FIG. 2B(b). The frequency bands 217-1a and 217-1b, and 217-2a and 217-2b are the same as those in FIG. 2B(b), but signals 501-6a-1, 501-6a-2, and 501-6b are different from FIG. 2B(b). On the negative side of f0, a band with a bandwidth Δf502b from f0-f3 in the negative direction is selected as a utilizing frequency band. The band with the bandwidth Δf502b includes all usable frequencies. On the other hand, on the positive side of f0, a band with a bandwidth Δf502a-1 from f0+f3 and a band with a bandwidth Δf502a-2 from f0+f4 are usable, and are selected as utilizing frequency bands. At respective frequencies, signals 501-6b, 501-6a-1, and 501-6a-2 are output. These signals generate spurious components 504-6b, 504-6a-1, and 504-6a-2 at symmetric frequency positions due to an imbalance of the analog unit. Since the spurious components 504-6a-1 and 504-6a-2 due to the signals 501-6a-1 and 501-6a-2 are completely included in the band of the signal 501-6b, they do not adversely influence other systems. On the other hand, the spurious components 504-6b due to the signal 501-6b partially overlap the signals 501-6a-1 and 501-6a-2 and also partially overlap another system signal (or electromagnetic noise) 503. The signal 503 suffers an interference, but the frequency of the signal 503 is that which is determined to allow only spurious components. Since it is determined that the signal 503 is hardly influenced by the spurious components generated by the terminal of this embodiment, such utilizing frequency band selection is made.

With this selection, no influence is imposed on other systems, and the signal 501-6b need not be divided into two signals. As a result, the number of carriers to be multiplexed is decreased, and the processing load on the terminal can be reduced, thus moderating the dynamic range requirement.

Figure 6:
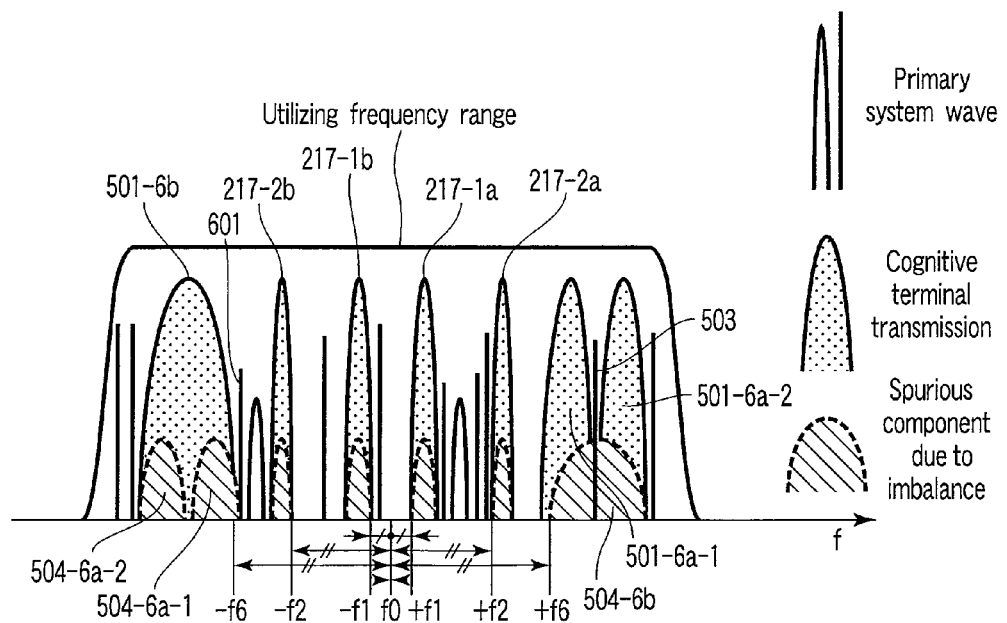
FIG. 6 shows an example of a method of assuring a utilizing frequency band of the embodiment.

Furthermore, the utilizing frequency range may have such relationship on both the sides, as shown in FIG. 6. In FIG. 6, the spurious components 504-6b of the signal 501-6b overlaps the other system wave (or electromagnetic noise) 503 as in FIG. 5. Furthermore, the spurious components 504-6a-1 of the signal 501-6a-1 overlap another system wave (or electromagnetic noise) 601. As in the case of the signal 503, it is determined that the signal 601 also has a resilience to an interference, and the bandwidth of the signal 501-6a-1 is set to be larger than FIG. 5.

Note that when the signal 503 or 601 is not electromagnetic noise but a wave from another system, it is determined based on the following criterion that spurious components may overlap this signal. This is when a spectral mask for that frequency is specified, and spurious components generated by the terminal of this embodiment fall within that mask. When such spectral mask is not specified, the following measure is taken. A threshold used to determine whether spurious components generated by the terminal of this embodiment are so small that they do not influence receiving of other systems at respective frequencies is set. This threshold is set in correspondence with a power received by the idle frequency detection unit 105. If the receiving power is greater than or equal to this threshold, that frequency is determined to allow only spurious components. In other words, this is the case wherein another radio communication terminal which is using an unusable frequency has a high tolerance against an interference. In such case, the receiving sensitivity requirement of another system terminal or the threshold need be stored in a database or the like. The radio communication terminal of this embodiment may comprise such database. Alternatively, a database may externally exist, and the radio communication terminal may access there.

When there are a plurality of candidates of slightly asymmetric pairs of utilizing frequency bands, and not all of them need be selected in terms of capacity, the utilizing frequency bands may be selected in the order from the pair whose spurious components overlap the frequency of a system with a higher resilience to an interference.

(Modification 3)

A case will be described below wherein a plurality of pairs of utilizing frequency bands symmetric about the center frequency can be assured within the utilizing frequency range, and not all utilizing frequency bands need be used in consideration of the transmission rate requirement. In such case, the cognitive terminal of this embodiment selects in the order of capacity from pairs of utilizing frequency bands with greater capacities with reference to its required transmission rate. The capacity may be the bandwidth of the utilizing frequency band. However, if the modulation level or modulation scheme is changed depending on frequencies, transmission rates in the utilizing frequency bands may be compared.

For example, a case will be examined below wherein the state in the utilizing frequency range is as shown in FIG. 2B(b) if it is fully used. Assume that the capacities of right and left symmetric usable frequency bands which can be utilizing frequency bands are large in the order of (the bandwidths including) the frequency bands 217-4a and 217-4b, (the bandwidths including, the same applies to the following frequency bands) the frequency bands 217-3a and 217-3b, the frequency bands 217-1a and 217-1b, and the frequency bands 217-2a and 217-2b. If the terminal of this embodiment does not require all of these frequency bands, it selects the frequency bands 217-4a and 217-4b first. If the capacity falls short, the terminal selects the frequency bands 217-3a and 217-3b. In this way, the terminal selects frequency bands in descending order of bandwidth. However, the terminal finally selects a utilizing frequency band having a required minimum capacity so as to minimize the redundant capacity in the selected utilizing frequency bands.

Figure 7:
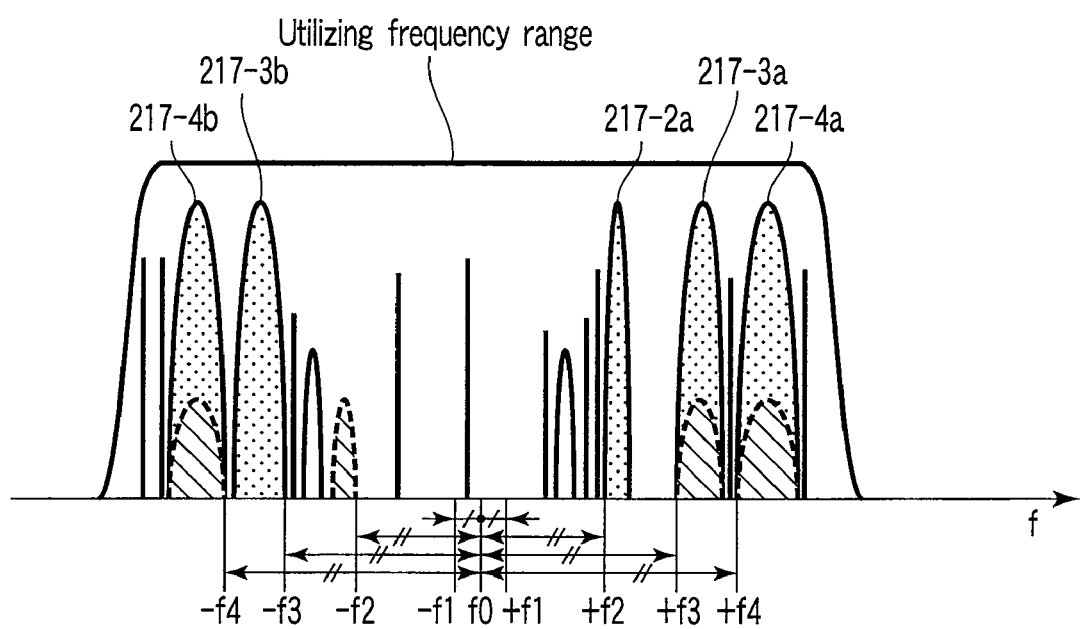
FIG. 7 shows an example of a method of selecting a utilizing frequency band of this embodiment.

For example, the terminal selects utilizing frequency bands, as shown in FIG. 7. After the terminal selects the frequency bands 217-4a and 217-4b, and 217-3a and 217-3b, it compares the remaining required capacity with the next-wider bands 217-1a and 217-1b. Since it is determined that the remaining required capacity is less than that of the frequency bands 217-1a and 217-1b, and only one of the frequency bands 217-2a and 217-2b with the smaller capacity than the bands 217-1a and 217-1b is sufficient, the terminal determines use of only the frequency band 217-2b.

The sequence to be executed by the radio communication terminal to attain such selection will be described below with reference to FIG. 8.

Let C be the required band, and $2*a_1, 2*a_2, \ldots$ be frequency bands in descending order of capacity under the assumption that the transmission capacities of the respective utilizing frequency band pairs are perfectly symmetrical to each other. In order to identify the end of frequency bands, imaginary frequency bands $2*a_n$ with zero capacity are assumed. If $a_n$ is to be compared, this means that there is no utilizing frequency band to be selected under the identical conditions. Assume that the total of the capacities of these frequency bands is C or more. In the following description, a utilizing frequency band will be described using its size. Let R be the remaining required band during selection. Then, R=C for the first pair (step S801). R is then compared with the utilizing frequency band pair with the maximum capacity, which remains as that time, i.e., with $2*a_i$ if the i-th pair has the maximum capacity (step S802). If R is greater than $2*a_i$, $2*a_i$ is selected. $R-2*a_i$ is substituted in R, and i+1 is substituted in i (step S803). The process then returns to step S802. If R becomes less than or equal to $2*a_i$, R is then compared with $a_i$ (step S804). If R is less than $a_i$, R is then compared with $a_{i+1}, a_{i+2}, \ldots$ (steps S805 and S806). If a frequency band less than R is found, a frequency band immediately before that frequency band is selected as a utilizing frequency band, thus ending the processing (step S807). If R is greater than or equal to $a_i$, R is compared with the next largest pair $2*a_{i+1}$ (steps S808 and S809). Likewise, if the capacity of the pair becomes less than R, the immediately preceding pair is selected, and the processing ends (step S810).

In this way, the last frequency band or last pair has a minimum required capacity. Note that the sequence shown in FIG. 8 is an algorithm which reduces the total number of utilizing frequency bands by selecting, when either a pair or one band of the pair can be selected last, only one of the pair. When the number of utilizing frequency bands is small, the PAPR becomes small, as described above, and specifications required for the terminal are moderated.

However, a situation that uses only one band of the pair generates only spurious components in a frequency band corresponding to the other of the pair, as shown in FIG. 4. If the primary user starts transmission in the other of the pair, and does not have a sufficient spurious resilience, the terminal need to cancel the use of the selected utilizing frequency band, or divide the band. Of course, the same applies to a case wherein a primary user starts transmission in the selected utilizing frequency band. On the other hand, when an algorithm which preferentially selects a pair is used, the total value of the bandwidths as the pair is basically half of that upon selecting only one band. For this reason, the risk of cancelling the utilizing frequency range upon starting transmission by the primary use becomes small. Therefore, when it is expected that the primary user in the utilizing frequency range starts transmission at a high frequency of occurrence, it is desired to preferentially select a pair.

The sequence to be executed by the radio communication terminal in such case will be described below with reference to FIG. 9. This sequence is basically the same as that shown in FIG. 8, but a pair is preferentially selected. Only when the remaining required band R is smaller than the capacity of the minimum pair, the control enters a routine for selecting only one band of the pair.

If R is less than or equal to $2*a_i$ in step S802, i is substituted in m (step S901). It is checked whether $2*a_{i+1}$ is less than R (step S902). If $2*a_{i+1}$ is not less than R, i+1 is substituted in i (step S903) to repeat the checking process in step S902. If $2*a_{i+1}$ is less than R in step S902, it is checked whether $2*a_{i+1}=0$ (step S904). If $2*a_{i+1} \neq 0$ in step S904, $2*a_i$ is selected, thus ending the selection (step S906). If $2*a_{i+1}=0$ in step S904, it is checked whether R is greater than am (step S905). If R is greater than am, the process advances to step S906; otherwise, it is checked whether R is less than or equal to $a_i$ (step S907). If R is not less than or equal to $a_i$, the value i is decremented by one (step S908) and step S907 is repeated. If R becomes less than or equal to $a_i$, $a_i$ is selected (step S909).

When pairs include an asymmetric pair, as shown in FIGS. 5 and 6, $2*a_i$ is used as the total value of the capacities of the pair. When the control enters a single frequency band selection phase, bands of pairs which are not selected yet are sorted in descending order of capacity of a single frequency band to proceed with selection.

A practical determination method of a utilizing frequency range, its center frequency, and utilizing frequency bands executed by the frequency selection unit 106 will be described below. In some arrangements of terminals, the frequency selection unit 106 determines the utilizing frequency range for each communication session. However, in most cases, the frequency selection unit 106 determines the utilizing frequency range in advance to assure a transmission rate as high as possible, and selects utilizing frequency bands that meet a requirement for each communication session. Alternatively, the frequency selection unit 106 may also select utilizing frequency bands in advance, and may re-select them only when the transmission rate varies largely. The frequency selection unit 106 selects or changes the utilizing frequency range, for example, when the power source of the terminal is turned on, when the ambient radio wave situation has changed largely due to movement of the terminal, an extreme change in other systems' state, and the like, and when the required transmission rate of the terminal can no longer be satisfied.

The idle frequency detection unit 105 notifies the frequency selection unit 106 of usable frequencies and unusable frequencies of those which can be used by the self terminal or those to be used depending on circumstances such as the transmission distance and the like. When the idle frequency detection unit 105 has a function of analyzing details of a radio wave, it notifies the frequency selection unit 106 of frequencies that allow only spurious components at the same time.

The terminal of this embodiment can select a single utilizing frequency band near the center of the utilizing frequency range, as shown in FIG. 3. In the first step of determining the center frequency of the utilizing frequency range and utilizing frequency bands, the frequency selection unit 106 determines whether or not to adopt a mode for allocating a utilizing frequency band at the center.

The purpose of adopting such mode is to prevent a large usable frequency band from being divided although such usable frequency band exists but it cannot be used as one of symmetric utilizing frequency bands. FIG. 10 shows a flowchart of a routine for determining whether or not to allocate a utilizing frequency band at the center.

The frequency selection unit 106 searches for a group of usable frequencies that can assure a predetermined capacity or greater. The frequency selection unit 106 makes groups of usable frequencies from the state notified by the idle frequency detection unit 105, and searches for a largest group of them. If the bandwidth of that group or a transmittable rate to be assured there exceeds a predetermined threshold (step S1001), that group is allocated at the center of the utilizing frequency range (step S1005).

When the terminal determines the utilizing frequency range for each communication session, a rate required for that session or a frequency bandwidth corresponding to that rate can be set as the threshold. However, when it is determined to allocate a large usable frequency band at the center, the utilizing frequency range is fixed. As a result, a high total transmission rate in the utilizing frequency range may not often be assured as required. Therefore, especially, when the utilizing frequency range is determined in advance, it is desirable to set a threshold large enough not to pose any problem even when only one utilizing frequency band is assured. For example, the threshold is set to be half of the maximum value of the bandwidth of the utilizing frequency range. This threshold is defined as a first threshold.

Even when the condition based on the first threshold is not satisfied, the center allocation of a utilizing frequency band may often produce a better effect. Hence, the frequency selection unit 106 sets a second threshold to check this (step S1002). For example, the frequency selection unit 106 defines the second threshold as ¼ of the maximum value of the bandwidth of the utilizing frequency range. If the bandwidth of a maximum usable frequency band falls between the first and second thresholds, the frequency selection unit 106 makes the following decision. If a certainly large group of usable frequencies exists at neighboring frequencies, at which both the groups can be included in the identical utilizing frequency range, the frequency selection unit 106 forms a pair with that group. The bandwidth of that group has to exceed half of the bandwidth of the largest group so as to prevent the total transmission rate from becoming lower than that upon using the former frequency band alone (step S1003). In some cases, the total transmission rate may not be reduced using neighboring frequencies that allow only spurious components or by forming a plurality of pairs. However, this is all that is needed for the identification method as to whether or not to allocate a utilizing frequency band at the center. However, since this case can be included in a normal utilizing frequency range determination algorithm to be described later with reference to FIG. 13, if this condition is satisfied, the control leaves the center allocation routine without allocating any utilizing frequency band at the center.

If another frequency band that can form a pair is not available, the frequency selection unit 106 allocates the maximum usable frequency band falling between the first and second thresholds at the center. If the maximum usable frequency band is less than the second threshold, the unit 106 determines not to allocate it at the center (step S1004). Note that the aforementioned numerical values are merely examples. In the sequence, the value of the bandwidth indicates the band itself as in the above case. If the utilizing frequency band is allocated at the center, the control then enters a routine for determining utilizing frequency bands around it (step S1006). Otherwise, the control enters a normal utilizing frequency range determination algorithm to be described later with reference to FIG. 13 (step S1004).

After the utilizing frequency band to be allocated at the center is determined, the frequency selection unit 106 determines other utilizing frequency bands as follows. In a simplest method, the frequency selection unit 106 sets the center frequency of the utilizing frequency band allocated at the center as that of the utilizing frequency range, checks whether symmetric usable frequency bands are available, and determines them as pairs of utilizing frequency bands. If the utilizing frequency range includes frequencies that allow only spurious components, the frequency selection unit 106 checks whether the bandwidth of each determined utilizing frequency band can be increased. If the bandwidth can be increased, the frequency selection unit 106 increases that bandwidth. In some cases, the frequency selection unit 106 combines utilizing frequency bands which have been temporarily divided into two or more bands (e.g., a set of frequency bands 501-6b, 501-6a-1, and 501-6a-2 shown in FIG. 5).

When the center frequency of the utilizing frequency band allocated at the center is determined as that of the utilizing frequency range, the center frequency is uniquely determined. As a result, the total transmission rate of other utilizing frequency bands cannot be so large, or other utilizing frequency bands may be divided very finely. In order to avoid such situation, a mechanism which sets the center frequency of the utilizing frequency range to be slightly different from that of the utilizing frequency band allocated at the center, and re-calculates the transmission rate and the number of pairs of utilizing frequency bands may be provided.

Figure 11:
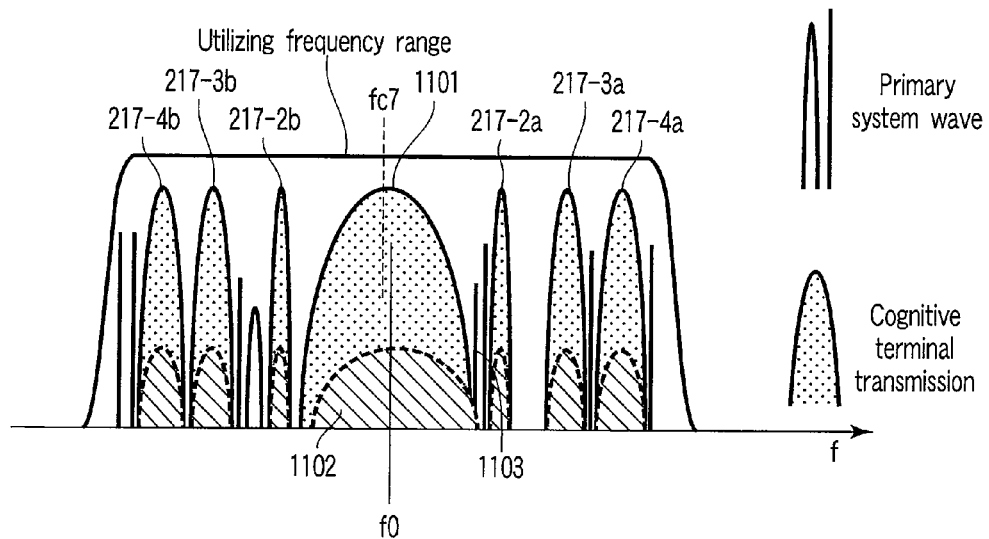
FIG. 11 shows an example of a method of assuring a utilizing frequency band of the embodiment.

The frequency selection unit 106 determines a range of center frequency candidates. When the center frequency of the utilizing frequency range is largely different from that of the utilizing frequency band allocated at the center, the bandwidth which can be symmetrically assured in the central utilizing frequency band decreases considerably utilizing frequency band, and the transmission rate may lower. For example, the range of the center frequency candidates may be determined to be 1/10 of the maximum value of the bandwidth of the utilizing frequency range. For example, five or ten frequencies are selected as center frequency candidates from that range, and the total transmission rate and the number of utilizing frequency bands are checked in each case. Then, the unit 106 searches for a frequency at which a high transmission rate can be assured and the number of utilizing frequency bands can be reduced without decreasing the transmission rate so much. The best choice depends on the design. If a frequency that can assure performance approximate to a target is found, that frequency is set as the center frequency. When this center frequency is different from that of the utilizing frequency band allocated at the center, the rate of the central utilizing frequency band decreases. Thus, the unit 106 verifies whether each of unusable frequencies on the right and left sides of the central utilizing frequency band, especially, a frequency which is closer to the center frequency of the utilizing frequency range, is a frequency that allows only spurious components. If the frequency is one which allows only spurious components, the bandwidth of the central utilizing frequency band may be increased so that spurious components overlap there. For example, the bandwidth is increased, as shown in FIG. 11. The center frequency f0 of the utilizing frequency range is different from a center frequency fc7 of the utilizing frequency band allocated at the center, and spurious components 1102 of a signal 1101 overlaps another system signal 1103 on its high-frequency side. Note that the signal 1103 is electromagnetic noise or a signal with a high interference resilience. This results from widening the utilizing frequency band allocated at the center to the low-frequency side since the frequency of the signal 1103 allows only spurious components.

After the center frequency of the utilizing frequency range is determined, the frequency selection unit 106 selects pairs of utilizing frequency bands calculated upon determination of the center frequency as utilizing frequency bands. As for these bands, the unit 106 may re-check whether their bandwidth can be increased using a frequency that allows only spurious components.

An example of the utilizing frequency range and utilizing frequency band selection algorithm when any utilizing frequency band is not allocated at the center of the utilizing frequency range will be described below with reference to FIG. 13.

The simplest method is to set the center between two wide usable frequency bands as the center frequency of the utilizing frequency range. First, the frequency selection unit 106 forms groups of usable frequencies. The unit 106 assigns numbers to the groups in descending order of width or transmission rate of the groups (step S1301). For example, these groups are assigned numbers like $b_1, b_2, \ldots$ in descending order. The unit 106 forms a pair of two groups in descending order, i.e., a pair of groups $b_1$ and $b_2$ (step S1302), and checks whether they have a frequency relationship falling within an identical utilizing frequency range. This condition is met if the difference between the maximum frequency of a frequency band located at the high-frequency side in the pair and the minimum frequency of a frequency band located at the low-frequency side is less than the maximum value of the bandwidth of the utilizing frequency range (step S1303). If this condition is satisfied, the unit 106 determines a frequency between the two groups as the center frequency of the utilizing frequency range (step S1305). If this condition is not satisfied, the unit 106 similarly checks the next largest pair of groups $b_1$ and $b_3$. The unit 106 repeats this process until both the groups fall within the identical utilizing frequency range (step S1304). In this way, the unit 106 determines the center frequency. Note that the checking order is defined so that symmetric utilizing frequency bands that can be assured in the formed pair have a higher transmission rate. For example, the order is defined like $(b_1, b_2), (b_1, b_3), (b_2, b_3), (b_1, b_4)$, so as to avoid frequency bands with greater suffix numbers from appearing in the pairs as much as possible. In the sequence shown in FIG. 13, such order is realized by changing the suffix to be incremented by seeing whether the difference between i and j is 1 or 2 (step S1304).

(Center Frequency Selection Method 1)

After the pair is determined, the frequency selection unit 106 then determines the center frequency of the utilizing frequency range (step S1305). In a simplest method, a frequency obtained by adding the center frequencies of the pair of bands to each other, and dividing the sum by 2 is set as the center frequency of the utilizing frequency range. The subsequent processes are the same as those described so far. That is, the unit 106 determines utilizing frequency bands in the sequence for searching for and determining a pair of symmetric use frequencies, and for sometimes forming a pair of asymmetric use frequencies in consideration of a frequency that allows only spurious components. When the unit 106 perfectly symmetrically selects pairs, it does not select a part where no spurious components overlap as a utilizing frequency band. Since the pair selected first often have asymmetric bandwidths upon selection of that pair, the sequence preferably includes symmetrization. FIG. 13 shows the simplest sequence when the center frequency is defined at the center of the center frequencies of utilizing frequency bands which are determined first, and asymmetrization is not executed.

(Center Frequency Selection Method 2)

Figure 12:
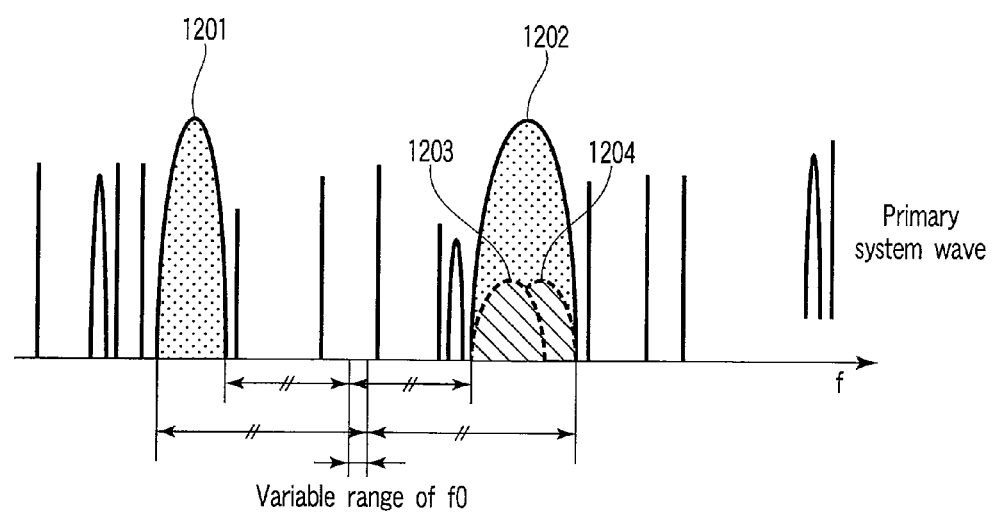
FIG. 12 is a view for explaining a variable range of the center frequency of a utilizing frequency range.

As another method of determining the center frequency of the utilizing frequency range while focusing on performance after the pair is determined, the following method may be used. The frequency selection unit 106 changes the center frequency of the utilizing frequency range within the range where spurious components from the narrower frequency band in this pair overlap the wider frequency band. The unit 106 then checks whether the rate assured in the utilizing frequency range or the number of utilizing frequency bands improves. A description will be given with reference to FIG. 12. Reference numbers 1201 and 1202 denote signals temporarily allocated on the determined pair. In this stage, the frequency bands are not symmetrized yet. The range of the center frequency f0 of the utilizing frequency range, which is located between the signals 1201 and 1202 and where spurious components of the signal 1201 as the frequency band with a smaller bandwidth perfectly overlap the signal 1202, is as illustrated in FIG. 12. That is, this range extends from the average between frequencies at the high-frequency end of the signal 1201 and at the low-frequency end of the signal 1202 to the average of frequencies at the low-frequency end of the signal 1201 and at the high-frequency end of the signal 1202. The unit 106 assumes several ones of frequencies as many as the number of frequencies corresponding to the width of the range as the center frequency of the utilizing frequency range, examines rates and the like which can be assured at these frequencies, and selects a frequency with the best result. The processes after the center frequency are determined are the same as those described above.

Figure 13:
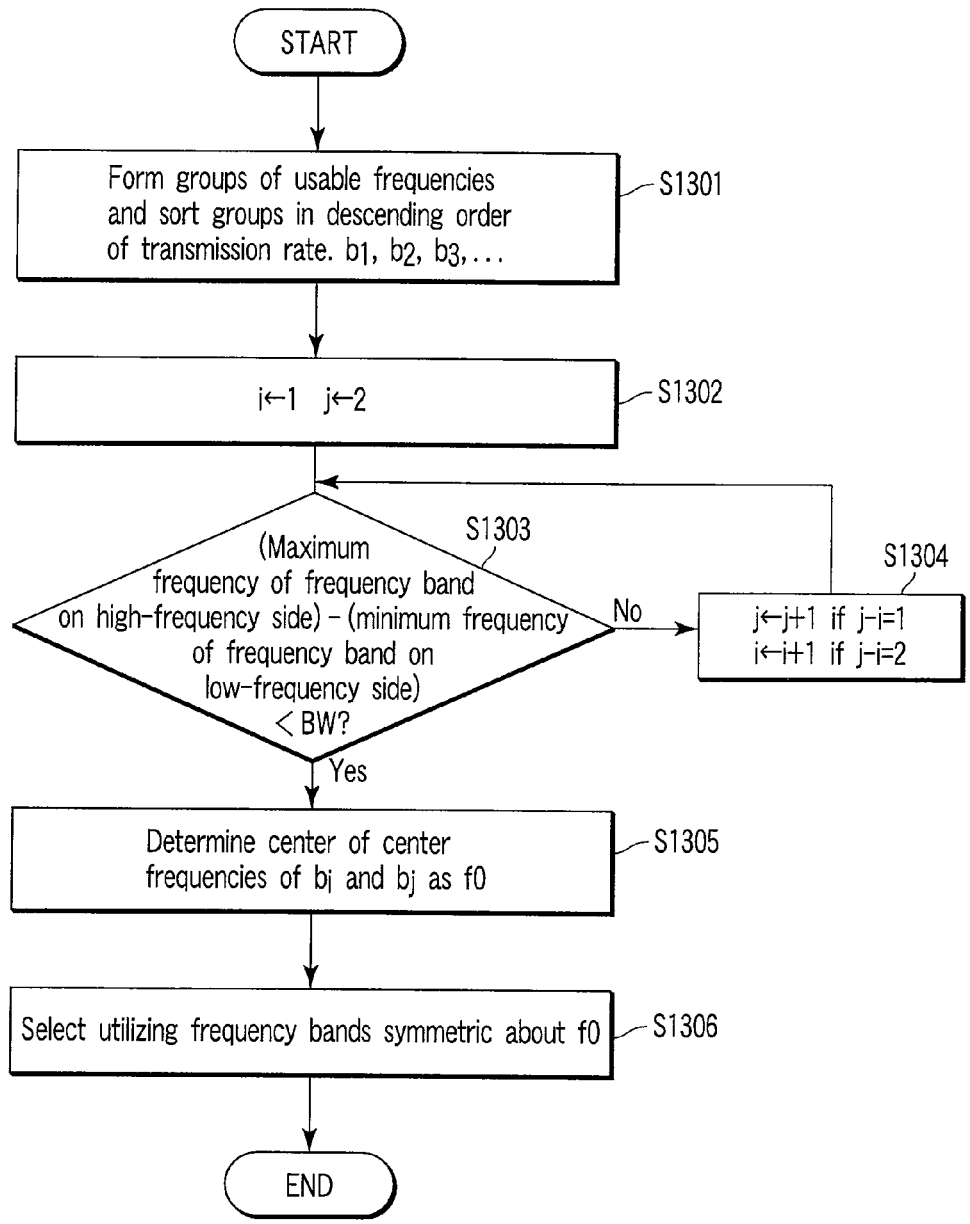
FIG. 13 is a flowchart showing an example of a center frequency determination method of a utilizing frequency range.

In the sequence shown in FIG. 13, when a pair which falls within the utilizing frequency range is found by checking a pair of bands in descending order, the frequency selection unit 106 determines that pair. However, in order to define a center frequency with higher performance, the unit 106 may find and compare a plurality of pair candidates. For example, when the unit 106 similarly finds pairs in the same manner as in FIG. 13, and finds a predetermined number of pairs, i.e., three pairs, five pairs, or the like, it determines their center frequencies and compares their performances. For each pair, the unit 106 assumes several center frequencies, as shown in FIG. 12, and compares the performances, thereby selecting a center frequency with the highest performance. In this case, a lower limit may be set for the bandwidth of the pair to be checked. If a predetermined number of pairs with bandwidths greater than or equal to the lower limit cannot be found, the step of searching for a pair ends if one or more pairs are found. As a result, excessive processes due to small utilizing frequency bands which are insignificant to form pairs is not required.

(Center Frequency Selection Method 3)

As still another method of selecting the center frequency of the utilizing frequency range, the following method may be used. This method will be described below with reference to FIG. 14. As in other methods, the frequency selection unit 106 generates groups of usable frequencies. The unit 106 then selects a predetermined number of groups (e.g., four or eight groups) in descending order of bandwidth or transmission rate. Alternatively, the unit 106 selects groups greater than or equal to a predetermined threshold as candidates. Reference numbers 1401 to 1407 in FIG. 14 denote these groups. Note that the maximum value of the utilizing frequency range is given. The unit 106 temporarily allocates a utilizing frequency range to include any of the groups 1401 to 1407, and determines a utilizing frequency range which has a highest performance (e.g., the total transmission rate is highest, or a predetermined transmission rate or higher can be assured and the number of utilizing frequency bands is smallest) as the utilizing frequency range. Next, the unit 106 determines utilizing frequency bands which can be symmetrically assured within the utilizing frequency range in the same manner as described above.

Figure 14:
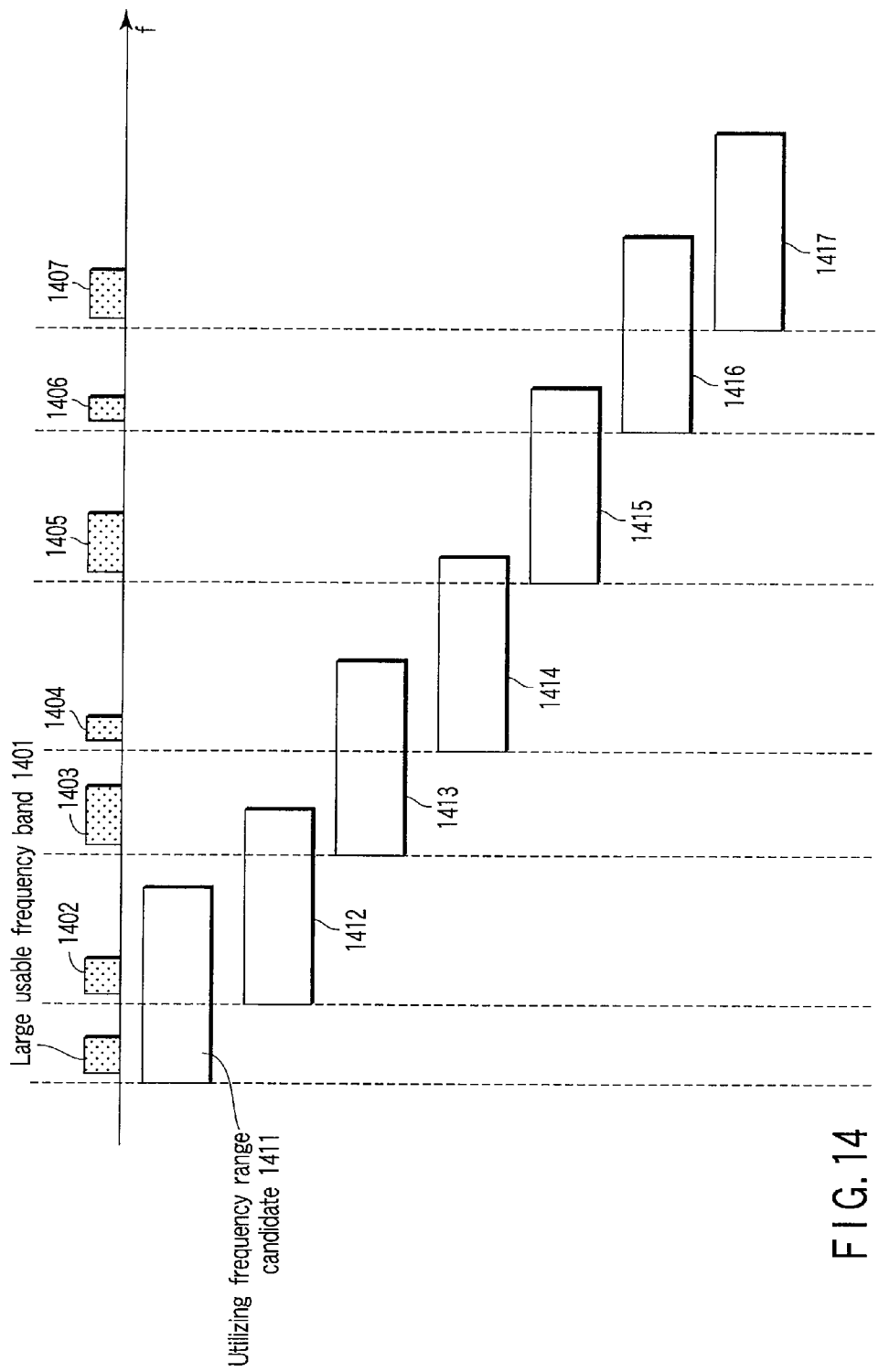
FIG. 14 shows an example of a center frequency determination method of a utilizing frequency range.

The allocation positions of the utilizing frequency range are determined so that the right or left half of each of candidates 1411 to 1417 of the utilizing frequency range perfectly includes a corresponding one of the large usable frequency bands 1401 to 1407, as shown in FIG. 14. This is to form pairs with other frequencies of the large usable frequency bands as much as possible. Alternatively, the utilizing frequency range may be allocated so that one of the usable frequency bands 1401 to 1407 is located just at the center of a corresponding one of the candidates 1411 to 1417 of the utilizing frequency range. FIG. 14 shows seven utilizing frequency range candidates. Of these candidates, the frequency selection unit 106 selects a utilizing frequency range candidate which can achieve a target better as the utilizing frequency range. After the utilizing frequency range is determined, the unit 106 determines utilizing frequency bands which can be assured to be symmetric about the center frequency of the utilizing frequency range in the same manner as described above.

(Center Frequency Selection Method 4)

As yet another method of selecting the center frequency of the utilizing frequency range, the following method may be used. As shown in FIG. 15, the frequency selection unit 106 divides the entire frequency band which may be used by the terminal into grids, and classifies them as usable and unusable frequencies. In FIG. 15, hatched frequencies are usable, and those which are not hatched are unusable. The unit 106 then calculates how many symmetric utilizing frequency bands can be assured as the number of grids in the maximum width of the utilizing frequency range. Desirably, the unit 106 makes such calculations by shifting a candidate of the utilizing frequency range from one end to the other end of the band which may be used. The unit 106 calculates the rate and the number of utilizing frequency bands for each candidate, and selects the best candidate with reference to the criterion at that time. In this case, the unit 106 combines neighboring usable grids to generate a group of usable frequency bands upon selection.

Grid steps may have various values. The grid step upon detection of the idle frequency detection unit 105 is the finest. When the computation volume becomes huge with that step, or when a small frequency band is not used as an independent utilizing frequency band, the step is increased. A finer step is more likely to assure a higher transmission rate. This method requires a highest calculation load, but a utilizing frequency range which best matches a target is likely to be selected.

In other methods as well, frequencies are processed while being divided into grids of a certain step. For example, grids of about 1 MHz are formed for the utilizing frequency range with bandwidth of 1 GHz. Since most of frequencies are licensed after they are divided into grids, they need not be detected in a step finer than the grid. Therefore, grids are already introduced when the idle frequency detection unit 105 detects idle frequencies, and the unit 105 checks whether each individual grid is usable or unusable.

(Arrangement of Receiver)

When the utilizing frequency bands are selected to be symmetric about the center frequency like in this embodiment, the arrangement of the receiver can be simplified. The receiver simultaneously digitizes the utilizing frequency range and performs demodulation by internal digital processing. In this case, the number of processing systems inside the digital unit is needed as many as the number of utilizing frequency bands if the utilizing frequency bands are not symmetrically allocated. On the other hand, when the utilizing frequency bands are symmetrically allocated, the number of processing systems can be as many as the number of pairs.

However, if there is an asymmetric part using a frequency that allows only spurious components, some additional processes are required.

Figure 16:
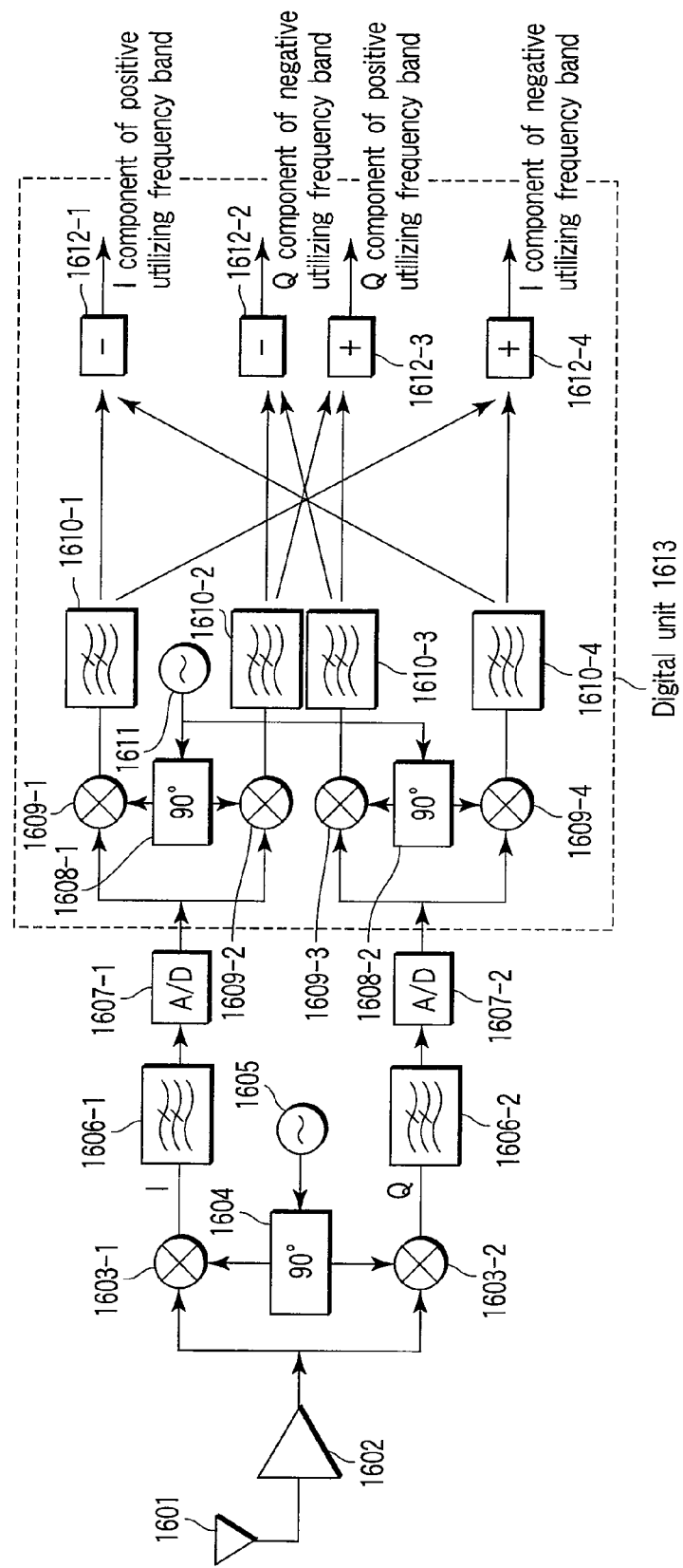
FIG. 16 is a block of a receiver of the radio communication terminal shown in FIG. 1.

FIG. 16 shows the arrangement of the receiver. FIG. 16 shows only minimum functions required for processing. In a digital unit 1613, only a system for processing one pair is extracted and illustrated.

A radio wave received by a receiving antenna 1601 is amplified to an appropriate level by an amplifier 1602 such as an LNA or the like, and is converted into baseband signals by frequency converters 1603-1 and 1603-2. A local oscillator 1605 outputs a local signal corresponding to the center frequency of each utilizing frequency band. This local signal passes through a 90° phase shifter 1604, which supplies local signals that are 90° out of phase to the frequency converters 1603-1 and 1603-2. The frequency converter 1603-1 converts the I components of the utilizing frequency range into a baseband signal, and the frequency converter 1603-2 converts the Q components of the utilizing frequency range into a baseband signal. Low-pass filters 1606-1 and 1606-2 extract utilizing frequency ranges. Analog-to-digital converters 1607-1 and 1607-2 sample these utilizing frequency ranges to convert them into digital signals. Subsequent processes are executed by the digital unit 1613.

The sampled digital signals include real number components and imaginary number components of complex signals which have zero as the center frequency of the utilizing frequency range, as shown in, e.g., FIG. 2B(b). From these components, signals of respective utilizing frequency bands are extracted and undergo demodulation processing. Paying attention to one (pair) of utilizing frequency bands, a local oscillator 1611 outputs a local signal corresponding to the frequency on baseband. The local signal is split into two signals, which are input to 90° phase shifters 1608-1 and 1608-2. Each phase shifter outputs two signals that are 90° out of phase. These signals are input to frequency converters 1609-1 to 1609-4. The frequency converter 1609-1 converts the I components of the I component of the utilizing frequency range into a true baseband with the 0 frequency. Likewise, the frequency converters 1609-2, 1609-3, and 1609-4 respectively convert the Q components of I components, the I components of Q components, and the Q components of Q components into true basebands. LPFs 1610-1 to 1610-4 filter these signals to obtain only signals of the corresponding utilizing frequency bands. These four signals are input to four adders 1612-1 to 1612-4 via the illustrated sequences. These adders make illustrated additions or subtractions. As a result, the adder 1612-1 outputs the I components of a signal on the positive side, i.e., the high-frequency side of the signals of the pair of utilizing frequency bands. Likewise, the adders 1612-3, 1612-4, and 1612-2 respectively output the Q components on the positive side, the I components on the negative side, and the Q components on the negative side.

As can be seen from FIG. 16, the receiver which simultaneously digitizes the utilizing frequency range like in this embodiment requires four frequency conversion systems in the digital unit 1613 even upon detection of, e.g., only one. That is, all four inputs to the adders 1612-1 and 1612-3 which output signals on the positive side come from different systems. The symmetric allocation of the utilizing frequency bands like in this embodiment allows to simultaneously demodulate signals on the negative side, and the number of systems can be halved compared to the case of individual demodulation.

In order to make the adders output signals perfectly corresponding to the I and Q components on the positive and negative sides, the transmitting side has to adjust the phases of signals to be transmitted in the symmetric utilizing frequency bands. This can be implemented without any problem by the arrangement shown in FIG. 1, which forms the entire utilizing frequency range by digital processing. Furthermore, the phases of the local oscillators of one or both of the two frequency conversions of the receiver have to be adjusted to attain correct demodulation. However, an arrangement which mixes and re-separates I and Q components from the outputs of the adders by signal processing without any phase adjustment of the local oscillators is also available.

The arrangement shown in FIG. 16 cannot perfectly demodulate an asymmetric pair using a frequency that allows only spurious components. Upon forming an asymmetric pair, if the absolute values of the center frequencies of the positive and negative signals match, the LFPs 1610-1 to 1610-4 are adjusted to a larger bandwidth, and the system shown in FIG. 16 demodulates only the signal with the large bandwidth. As for the signal with a smaller bandwidth, the output signal has to be filtered using LPFs with a smaller bandwidth once again. Or, simply, the LPFs are placed after the adders instead of before the adders.

When the center frequencies do not match, but spurious components generated by the narrower band do not fall outside the wider band like, for example, a combination of the frequency bands 501-6b, 501-6a-1, and 501-6a-2 as shown in FIG. 5, the processing is executed as follows. The LPFs are adjusted to the wider band to demodulate the signal of the wider band. The signals of the narrower band are re-mixed from the outputs to re-adjust the center frequencies, and the signal of the narrower band is demodulated. In this case, the demodulation system becomes slightly complicated. The right and left frequency bands may be demodulated by independent systems rather than they are demodulated at the same time. However, the signals are decimated when they have passed through the LPFs 1610-1 to 1610-4. Therefore, the load on the hardware or processing volume is reduced since the sampling rate is lowered.

Similar processing is required when the utilizing frequency band is allocated near the center of the utilizing frequency range and its center frequency does not match that of the utilizing frequency range. When the center frequencies match, I and Q components can be demodulated by inserting LPFs immediately after the two analog-to-digital converters in FIG. 16. In this case, two systems can be used in place of the four systems. However, when the center frequencies do not match, signals have to be demodulated by re-mixing complex signals from the signals of the two systems to re-adjust the center frequencies of the signals. Only required bands are decimated to reduce the processing load.

When the arrangement like in this embodiment is adopted, spurious components of self transmission which leak from the symmetric utilizing frequency bands may pose a problem depending on the spurious amount due to an imbalance between I and Q components. Such spurious components impair the transmission quality of the self terminal, and may impose a serious influence on the receiving sensitivity. An arrangement which removes influence of such spurious components or incorporates the power of spurious components in that of a received signal is also possible. More specifically, pilot signals sent in the symmetric utilizing frequency bands are set to have different codes and, desirably, to have orthogonality. The spectrum of spurious components generated by the imbalance is inverted. Since signals become conjugate complex numbers, i.e., only the polarity of Q components is inverted, it is more desirable that the pilot signals have orthogonality in this state. These pilot signals have to be different in a pair of right and left bands, but they may be the same as those in other pairs.

The receiver identifies the pilot signal which is included in the utilizing frequency band and is unique to the band, and the pilot signal of the spurious component which overlaps due to the imbalance. The ratio and phase relationship of these pilot signals are calculated. When such processing is applied to the pairs of utilizing frequency bands, a matrix and a determinant used to calculate signals to be received by the respective utilizing frequency bands can be calculated from signals transmitted in the respective utilizing frequency bands. The inverse matrix is calculated, and received data signals of the respective utilizing frequency bands are multiplied by the inverse matrix, thus estimating original signals from the received signals. Since the imbalance is more likely to be very slow to change even if it suffers a time variation, the inverse matrix need not be calculated frequently. In effect, it is sufficient to execute such calculation every time the utilizing frequency bands are changed.

According to the aforementioned embodiment, in a system which dispersedly uses a plurality of frequencies, and adds, by the RF unit, the I and Q components of frequency-division-multiplexed signals after the I and Q components are converted into analogue signals with respective digital-to-analogue converters, even when the adding system of the RF unit suffers imbalance between I and Q components, spurious components due to an imbalance are never generated on the band of a primary system which may exist in the niches of discrete frequencies and is vulnerable to an interference. As a result, a radio communication system which does not readily generate an interference can be configured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication terminal comprising:
a detection unit configured to detect a plurality of usable frequencies of a frequency range, in which the radio communication terminal plans to transmit, at least depending on whether or not a power of a first received signal is greater than a first threshold;
a selection unit configured to select, when a first frequency band from $f0+f1$ to $f0+f1+\Delta f1$ ($f1$ is a first frequency, and $\Delta f1$ is a first bandwidth) and a second frequency band from $f0-f1-\Delta f1$ to $f0-f1$ are simultaneously usable with respect to a center frequency $f0$ of a utilizing frequency range including the usable frequencies, the first frequency band and the second frequency band as a pair of utilizing frequency bands; and
a transmission unit configured to transmit different signals in the pair of utilizing frequency bands.

2. The terminal according to claim 1, wherein the selection unit selects a plurality of pairs of utilizing frequency bands with respect to the center frequency $f0$.

3. The terminal according to claim 1, wherein the transmission unit sets one of the different signals in the pair as no signal.

4. The terminal according to claim 1, wherein the transmission unit sets both of the different signals in the pair as no signals.

5. The terminal according to claim 1, wherein when a third frequency band from $f0-\Delta f2/2$ ($\Delta f2$ is a second bandwidth) to $f0+\Delta f2/2$ is usable with respect to the center frequency $f0$, the selection unit selects the third frequency band as a utilizing frequency band.

6. The terminal according to claim 1, wherein the selection unit selects the center frequency $f0$ to obtain a required transmission rate with the usable frequencies, and
the transmission unit sets the center frequency $f0$.

7. The terminal according to claim 1, wherein when all frequencies in either the first frequency band or the second frequency band are usable, and some frequencies in the other frequency band are usable, the selection unit selects usable frequencies included in the first frequency band and the second frequency band, as a pair of utilizing frequency bands.

8. The terminal according to claim 7, wherein the detection unit further detects, based on at least one of features including bandwidth, temporal variation in usage state, frequency feature of a second received signal and temporal feature of the second received signal of the unusable frequencies in the first or second frequency band, whether or not the second received signal is electromagnetic noise, and
when it is determined based on a detection result of the detection unit that the second received signal in the other frequency band is electromagnetic noise, the selection unit performs selection according to claim 7.

9. The terminal according to claim 7, wherein when a tolerance to an interference of another radio communication terminal which is using an unusable frequency in the other frequency band is higher than a second threshold, the selection unit performs selection according to claim 7.

10. The terminal according to claim 1, wherein when a plurality of pairs of utilizing frequency bands are selected and a total of transmission rates in the pairs of utilizing frequency bands exceeds a transmission rate that the self terminal requires, the selection unit selects the frequency bands in the order of transmission capacity from pairs of utilizing frequency bands with greater transmission capacities.

11. The terminal according to claim 1, wherein the selection unit makes groups of the usable frequencies based on a distribution of the usable frequencies and searches for a combination of two groups that fall within a range below an upper limit of a bandwidth of the utilizing frequency range, in descending order of transmission rate expected in each group, and when the selection unit finds the combination, the selection unit determines, as the center frequency, a frequency which is included between the average value of the two outermost frequencies of the two groups of the combination and the average value of the two innermost frequencies of the two groups of the combination.

12. The terminal according to claim 1, wherein the selection unit makes groups of the usable frequencies based on a distribution of the usable frequencies, makes a plurality of combinations of two groups, which fall within a range below an upper limit of a bandwidth of the utilizing frequency range, in descending order of transmission rate expected in each group, determines the average of center frequencies of the two groups in each combination as a center frequency candidate, searches for other pairs of utilizing frequency bands which can be selected for the determined center frequency candidate, and determines, as the center frequency of the utilizing frequency range, a center frequency candidate which has best value against a performance target that the self terminal requires.

13. The terminal according to claim 12, wherein the performance target is total value of transmission rates in utilizing frequency bands which are assured in the utilizing frequency range, and is decided better with increasing total value.

14. The terminal according to claim 12, wherein the performance target is the total number of utilizing frequency bands when total value of transmission rates in utilizing frequency bands which are assured in the utilizing frequency range is more than a predetermined value, and is decided better with decreasing total number.

15. The terminal according to claim 1, wherein the selection unit makes groups of the usable frequencies based on a distribution of the usable frequencies, selects a plurality of groups having a transmission rate more than a predetermined rate from the groups, determines a plurality of utilizing frequency range candidates each having a bandwidth corresponding to the upper limit of bandwidth of the utilizing frequency range from a whole band which may be used by the self terminal to include at least one group having the transmission rate more than the predetermined rate, and determines, as the center frequency of the utilizing frequency range, a center frequency of one of the utilizing frequency range candidates which has best value against a performance target that the self terminal requires.

16. The terminal according to claim 15, wherein the performance target is total value of transmission rates in utilizing frequency bands which are assured in the utilizing frequency range, and is decided better with increasing total value.

17. The terminal according to claim 15, wherein the performance item is the total number of utilizing frequency bands when the total value of transmission rates in utilizing frequency bands which are assured in the utilizing frequency range is more than a predetermined value, and is decided better with decreasing total number.

18. The terminal according to claim 1, wherein the selection unit divides a whole band which may be used by the self terminal into grids, assigns usable and unusable flags to the grids based on a detection result of the detection unit, shifts a center frequency candidate in unit of respective grids, calculates a value for a performance target the radio communication terminal requires within a range below the upper limit of bandwidth of the utilizing frequency range, and selects, as the center frequency of the utilizing frequency range, the center frequency candidate with best value.

19. The terminal according to claim 18, wherein the performance target is total value of transmission rates in utilizing frequency bands which are assured in the utilizing frequency range, and is decided better with increasing total value.

20. The terminal according to claim 18, wherein the performance target is the total number of utilizing frequency bands when the total value of transmission rates in utilizing frequency bands which are assured in the utilizing frequency range is more than a predetermined value, and is decided better with decreasing total number.

21. The terminal according to claim 1, wherein the selection unit selects, as a utilizing frequency band, at least one range of usable frequencies having a bandwidth more than a predetermined value of usable frequencies detected by the detection unit, and determines a center frequency of the utilizing frequency band as the center frequency of the utilizing frequency range.

* * * * *